US012251773B2

(12) United States Patent
Ivkovich

(10) Patent No.: US 12,251,773 B2
(45) Date of Patent: Mar. 18, 2025

(54) SYSTEMS AND METHODS FOR IDENTIFYING MISSING WELDS USING MACHINE LEARNING TECHNIQUES

(71) Applicant: ILLINOIS TOOL WORKS INC., Glenview, IL (US)

(72) Inventor: Stephen Paul Ivkovich, Hanover, MI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 883 days.

(21) Appl. No.: 17/319,670

(22) Filed: May 13, 2021

(65) Prior Publication Data

US 2022/0032397 A1 Feb. 3, 2022

Related U.S. Application Data

(60) Provisional application No. 63/057,388, filed on Jul. 28, 2020.

(51) Int. Cl.
*B23K 26/03* (2006.01)
*B23K 31/12* (2006.01)
(Continued)

(52) U.S. Cl.
CPC .......... *B23K 26/032* (2013.01); *B23K 31/125* (2013.01); *G06N 3/08* (2013.01);
(Continued)

(58) Field of Classification Search
CPC .. B23K 26/032; B23K 31/125; B23K 9/0953; G06N 3/08; G06N 20/00; G06T 7/0008;
(Continued)

(56) References Cited

U.S. PATENT DOCUMENTS 4,375,026 A 2/1983 Kearney
5,221,825 A 6/1993 Siewert
(Continued)

FOREIGN PATENT DOCUMENTS

CA 2356304 2/2001
CN 101193723 6/2008
(Continued)

OTHER PUBLICATIONS

The welding system of the future is self-learning (2015, Mar. 20) retrieved Apr. 7, 2015 from http://phys.org/news/2015-03-welding-future-self-learning.html.
(Continued)

*Primary Examiner* — Robert G Bachner
(74) *Attorney, Agent, or Firm* — McAndrews, Held & Malloy, Ltd.

(57) ABSTRACT

Systems and methods for missing weld identification using machine learning techniques are described. In some examples, a part tracking system uses machine learning techniques to identify whether an operator has missed one or more welds when assembling a part. The part tracking system may additionally identify which specific welds were missed (e.g., the first weld, the third weld, the fifteenth weld, etc.). The part tracking system may be able to identify missing welds after a part has been completed, or in real-time, during assembly of the part. Identification of the particular weld(s) missed during the welding process can help an operator quickly assess and resolve any issues with the part being assembled, saving time and ensuring quality.

20 Claims, 7 Drawing Sheets

(51) Int. Cl.
*G06N 3/08* (2023.01)
*G06T 7/00* (2017.01)

(52) U.S. Cl.
CPC .. *G06T 7/0008* (2013.01); *G06T 2207/20081* (2013.01); *G06T 2207/20084* (2013.01); *G06T 2207/30164* (2013.01)

(58) Field of Classification Search
CPC . G06T 2207/20081; G06T 2207/20084; G06T 2207/30164
See application file for complete search history.

(56) References Cited

U.S. PATENT DOCUMENTS

| | | | |
|---|---|---|---|
| 5,714,734 A | 2/1998 | Peterson et al. | |
| 5,756,967 A | 5/1998 | Quinn et al. | |
| 6,362,456 B1 | 3/2002 | Ludewig | |
| 6,484,584 B2 | 11/2002 | Johnson et al. | |
| 6,583,386 B1 | 6/2003 | Ivkovich | |
| 6,624,388 B1 | 9/2003 | Blankenship et al. | |
| 6,636,776 B1 | 10/2003 | Barton et al. | |
| 6,795,778 B2 | 9/2004 | Dodge et al. | |
| 6,815,640 B1 | 11/2004 | Spear et al. | |
| 7,159,753 B2 | 1/2007 | Subrahmanyam | |
| 7,375,304 B2 | 5/2008 | Kainec et al. | |
| 7,574,172 B2 | 8/2009 | Clark et al. | |
| 7,643,890 B1 | 1/2010 | Hillen et al. | |
| 7,687,741 B2 | 3/2010 | Kainec et al. | |
| 7,772,524 B2 | 8/2010 | Hillen et al. | |
| 7,873,495 B2 | 1/2011 | Lindell | |
| 8,224,881 B1 | 7/2012 | Spear et al. | |
| 8,274,013 B2 | 9/2012 | Wallace | |
| 8,354,614 B2 | 1/2013 | Ma | |
| 8,355,805 B2 | 1/2013 | Ricket | |
| 8,592,723 B2 | 11/2013 | Davidson et al. | |
| 8,657,605 B2 | 2/2014 | Wallace | |
| 8,847,115 B2 | 9/2014 | Casner et al. | |
| 9,193,004 B2 | 11/2015 | Enyedy et al. | |
| 9,266,182 B2 | 2/2016 | Hung | |
| 9,321,133 B2 | 4/2016 | Fischer et al. | |
| 9,415,514 B2 | 8/2016 | Geheb et al. | |
| 9,449,498 B2 | 9/2016 | Dina et al. | |
| 9,481,045 B2 | 11/2016 | Spear | |
| 9,498,839 B2 | 11/2016 | Hillen et al. | |
| 9,514,421 B2 | 12/2016 | Mullin | |
| 9,665,093 B2 | 5/2017 | Amers et al. | |
| 9,669,484 B2 | 6/2017 | Holverson et al. | |
| 9,684,303 B2 | 6/2017 | Lamers et al. | |
| 9,704,140 B2 | 7/2017 | Lamers et al. | |
| 9,724,787 B2 | 8/2017 | Becker et al. | |
| 9,773,429 B2 | 9/2017 | Boulware | |
| 9,821,400 B2 | 11/2017 | Hillen et al. | |
| 9,836,994 B2 | 12/2017 | Kindig et al. | |
| 9,862,048 B2 | 1/2018 | Holverson et al. | |
| 9,862,049 B2 | 1/2018 | Becker | |
| 9,889,517 B2 | 2/2018 | Lambert et al. | |
| 9,937,577 B2 | 4/2018 | Daniel | |
| 9,937,578 B2 | 4/2018 | Becker et al. | |
| 9,965,973 B2 | 5/2018 | Peters et al. | |
| 9,975,196 B2 | 5/2018 | Zhang et al. | |
| 9,993,890 B2 | 6/2018 | Denis et al. | |
| 10,010,959 B2 | 7/2018 | Daniel | |
| 10,012,962 B2 | 7/2018 | Lamers et al. | |
| 10,032,388 B2 | 7/2018 | Sommers et al. | |
| 10,065,260 B2 | 9/2018 | Hutchison | |
| 10,099,308 B2 | 10/2018 | Vogel | |
| 10,144,080 B2 | 12/2018 | Chantry et al. | |
| 10,183,351 B2 | 1/2019 | Peters | |
| 10,204,406 B2 | 2/2019 | Becker et al. | |
| 10,213,862 B2 | 2/2019 | Holverson et al. | |
| 10,242,317 B2 | 3/2019 | Barhorst et al. | |
| 10,688,584 B2 | 6/2020 | Starzengruber | |
| 10,722,969 B2 | 7/2020 | Ulrich | |
| 11,103,948 B2 | 8/2021 | Holverson | |
| 11,347,191 B2 | 5/2022 | Hsu | |
| 2006/0169682 A1 | 8/2006 | Kainec et al. | |
| 2008/0124968 A1 | 5/2008 | Kirk | |
| 2009/0173726 A1 | 7/2009 | Davidson et al. | |
| 2010/0152554 A1 | 6/2010 | Steine et al. | |
| 2012/0248081 A1 | 10/2012 | Hutchison | |
| 2013/0075380 A1 | 3/2013 | Albrech et al. | |
| 2013/0105556 A1 | 5/2013 | Abell | |
| 2013/0178953 A1 | 7/2013 | Wersborg | |
| 2013/0189658 A1 | 7/2013 | Peters | |
| 2013/0212512 A1 | 8/2013 | Frenz | |
| 2014/0047107 A1 | 2/2014 | Maturana | |
| 2014/0131320 A1 | 5/2014 | Hearn et al. | |
| 2014/0332514 A1 | 11/2014 | Holverson et al. | |
| 2014/0337429 A1 | 11/2014 | Asenjo | |
| 2015/0069112 A1 | 3/2015 | Abou-Nasr et al. | |
| 2017/0032281 A1 | 2/2017 | Hsu | |
| 2017/0036288 A1 | 2/2017 | Albrecht | |
| 2017/0072496 A1 | 3/2017 | Falde et al. | |
| 2017/0072497 A1 | 3/2017 | Ivkovich | |
| 2017/0185058 A1 | 6/2017 | Holverson et al. | |
| 2018/0032066 A1 | 2/2018 | Enyedy et al. | |
| 2018/0178320 A1 | 6/2018 | Webster | |
| 2019/0019061 A1 | 1/2019 | Trenholm et al. | |
| 2019/0022787 A1 | 1/2019 | Daniel | |
| 2019/0084069 A1 | 3/2019 | Daniel et al. | |
| 2019/0160601 A1 | 5/2019 | Daniel | |
| 2019/0163172 A1 | 5/2019 | Daniel et al. | |

FOREIGN PATENT DOCUMENTS

| | | |
|---|---|---|
| CN | 101329169 | 12/2008 |
| CN | 101374627 | 2/2009 |
| CN | 102528227 | 7/2012 |
| CN | 102596476 | 7/2012 |
| CN | 102922089 A | 2/2013 |
| CN | 103331506 | 10/2013 |
| CN | 103846915 | 6/2014 |
| CN | 103862135 | 6/2014 |
| CN | 103874965 | 6/2014 |
| CN | 103909325 | 7/2014 |
| CN | 104379291 | 2/2015 |
| CN | 104520046 | 4/2015 |
| CN | 104551372 | 4/2015 |
| CN | 104768694 | 7/2015 |
| CN | 106104587 | 11/2016 |
| CN | 107154950 | 9/2017 |
| CN | 107155317 | 9/2017 |
| CN | 107635710 | 1/2018 |
| CN | 107848083 | 3/2018 |
| CN | 108027911 | 5/2018 |
| DE | 102009016798 A1 | 10/2010 |
| WO | 0109723 | 2/2001 |
| WO | 2012000650 | 1/2012 |
| WO | 2013160745 | 10/2013 |
| WO | 2014149786 A1 | 9/2014 |
| WO | 2018080994 | 5/2018 |

OTHER PUBLICATIONS

Gundersen, O., et al., The Use of an Integrated Multiple Neural Network Structure for Simultaneous Prediction of Weld Shape, Mechanical Properties, and Distortion in 6063-T6 and 6082-T6 Aluminium Assemblies.

Huot, Pierre, The Basics of Weld and Process Monitoring, 20150409, Quality Magazine.

Porter, Nancy C., Session 5, Joining Technologies for Naval Applications, FABTECH International & AWS Welding Show, Nov. 13-16, 2015.

Zaharia, Matei, et al., Resilient Distributed Datasets: A Fault-Tolerant Abstraction for In-Memory Cluster Computing, Electrical Engineering and Computer Sciences, University of California at Berkeley, Technical Report No. UCB/ EECS-2011-82, http://www.eecs.berkeley.edu/Pubs/TechRpts/2011/EECS-2011-82.html, Jul. 19, 2011.

Lu, Huang et al: "Research on Hadoop Cloud Computing Model and its Applications", Networking and Distributed Computing (ICNDC),

(56) References Cited

OTHER PUBLICATIONS

2012 Third International Conference on, IEEE, Oct. 21, 2012 (Oct. 21, 2012), pp. 59-63, XP032293322, DOI: 10.1 109/1 CN DC.2012. 22 ISBN: 978-1-4673-2858-6.

PCT, Notification of Transmittal of the International Search Report and the Written Opinion of the International Searching Authority, or the Declaration, in Application No. PCT/US2016/051585, dated Dec. 21, 2016 (12 pages).

International Search Report and Written Opinion, mailed Oct. 14, 2016, in International application No. PCT/US2016/044463, filed Jul. 28, 2016.

Bao, Yuan et al: "Massive sensor data management framework in Cloud manufacturing based on Hadoop", Industrial Informatics (INDIN), 2012 10TH IEEE International Conference on, IEEE, Jul. 25, 2012 (Jul. 25, 2012), pp. 397-401, XP032235317, DOI: 10.1109/1 NDI N.2012.6301192 ISBN: 978-1-4673-0312-5.

PCT, Notification of Transmittal of the International Search Report and the Written Opinion of the International Searching Authority, or the Declaration, in International application No. PCT/US2016/051579, dated Jan. 10, 2017 (12 pages).

Canadian Office Action Appln No. 2,996, 182 dated Nov. 5, 2019 (5 pgs.).

European Patent Office, Extended Search Report, European Patent Application No. 20161414.6, mailed Aug. 5, 2020, 7 pages.

European Patent Office, Extended Search Report, European Patent Application No. 20176044.4, mailed Dec. 17. 2020, 9 pages.

European Patent Office, Extended European Search Report, European Patent Application No. 20192803.3, mailed Mar. 10, 2021, 7 pages.

Yuan Bao, et al., "Massive Sensor Data Management Framework in Cloud Manufacturing Based on Hadoop", IEEE, Jul. 25, 2012, pp. 397-401 (Y type reference).

European Patent Office, Office Action, No. 20192803.3, mailed Feb. 11, 2022.

Ting Wang, Binliang Jiao, Limeng Ji, "A Wireless Sensor Network Design in Oilfield based on STM32W108", Computer Security, No. 05, May 15, 2011.

Le Zhang, Guangzhi Li, Xin Zeng, "Analysis of Factors Affecting Human Reliability", China Military-Civilian Conversion, No. 03, Mar. 10, 2016.

Shuang Zheng, Mingri Zhu, Yue Wang, "Design of Welding Controlled System Power Source Based on Intensive Interference", Electric Welding Machine, No. 12, Dec. 20, 2008.

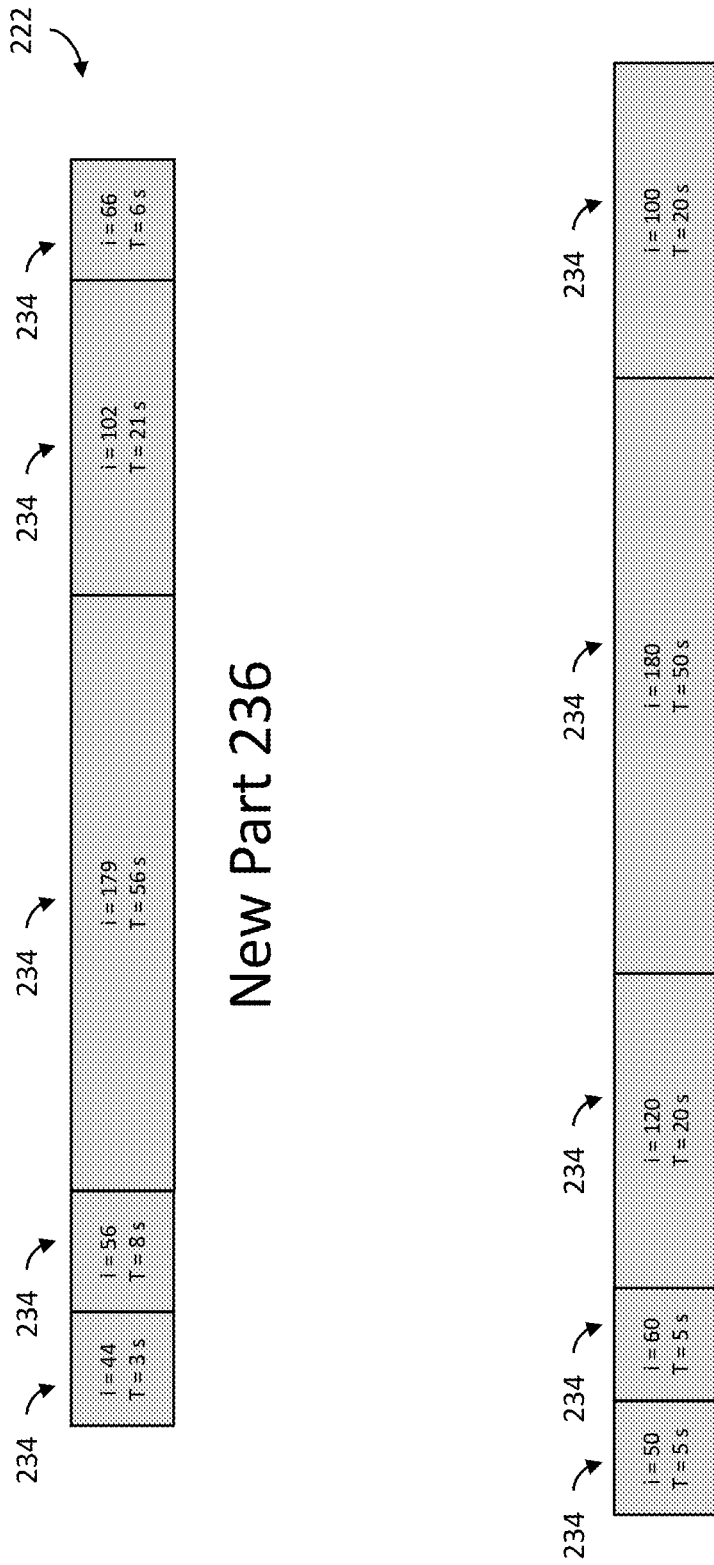

SYSTEMS AND METHODS FOR IDENTIFYING MISSING WELDS USING MACHINE LEARNING TECHNIQUES

CROSS REFERENCE TO RELATED APPLICATIONS

This application claims priority to, and the benefit of, U.S. Provisional Application No. 63/057,388, filed Jul. 28, 2020, entitled "SYSTEMS AND METHODS FOR IDENTIFYING MISSING WELDS USING MACHINE LEARNING TECHNIQUES," the entire contents of which are hereby incorporated by reference.

TECHNICAL FIELD

The present disclosure generally relates to identifying missing welds and, more particularly, to systems and methods for identifying missing welds using machine learning techniques.

BACKGROUND

Welding is sometimes used to assemble one or more workpieces into a single part. In some examples, several welds are performed in a particular order to assemble the part. If one or more of the welds used to assemble the part are mistakenly missed, the integrity and/or quality of the part may be negatively impacted.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to systems and methods for identifying missing welds using machine learning techniques, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

FIG. 4a is a diagram illustrating a simple example of a new part and typical part model, in accordance with aspects of this disclosure.

Figure 1:
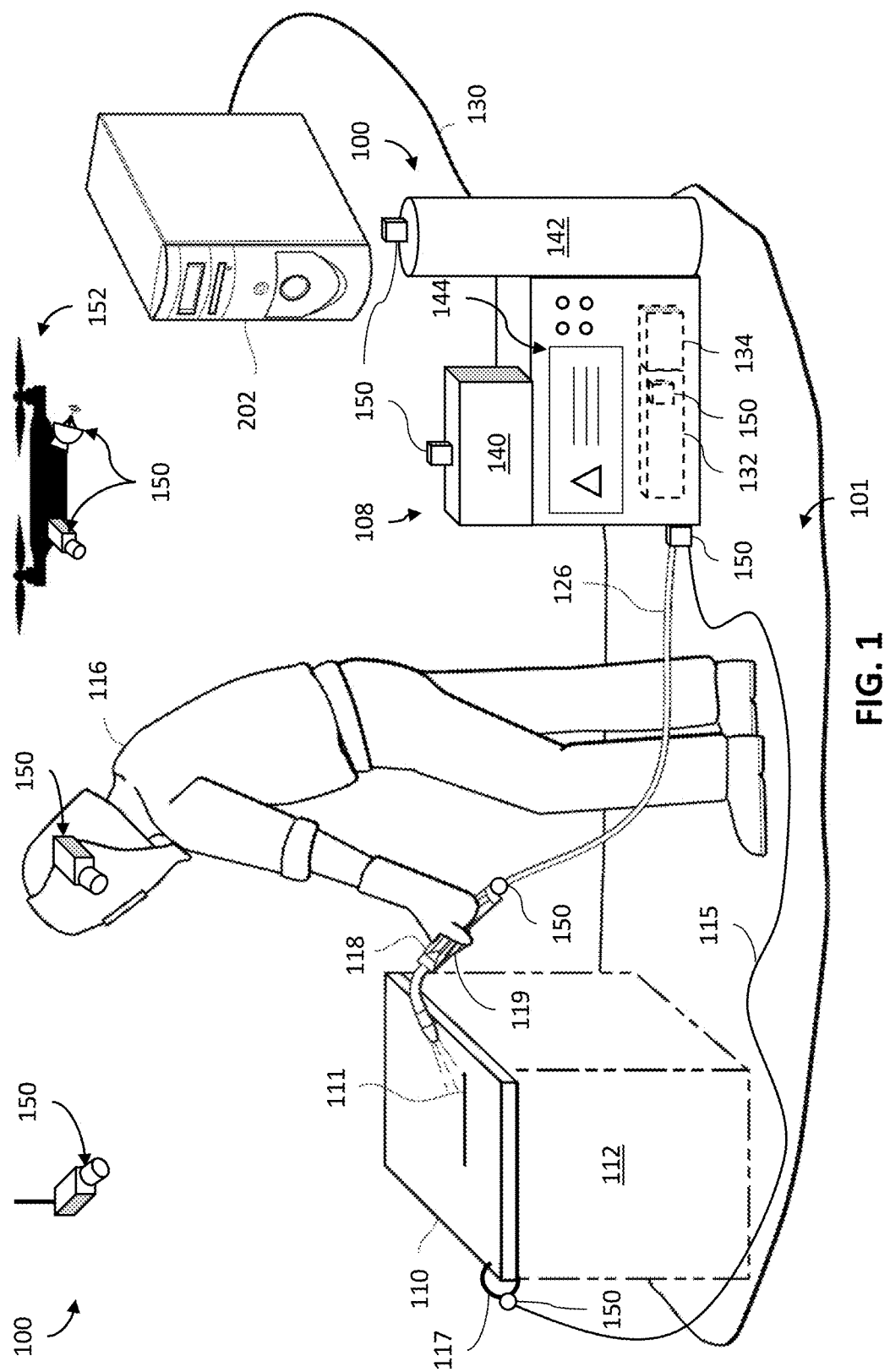
FIG. 1 shows an example of a welding system in communication with a tracking station, in accordance with aspects of this disclosure.

The figures are not necessarily to scale. Where appropriate, the same or similar reference numerals are used in the figures to refer to similar or identical elements. For example, reference numerals utilizing lettering (e.g., welding system 100a, welding system 100b) refer to instances of the same reference numeral that does not have the lettering (e.g., welding system 100).

DETAILED DESCRIPTION

Conventional part tracking systems can detect the number of welds performed during part assembly. Some part tracking systems can tell an operator if any welds were missed based on a comparison between the detected number of welds and an expected number of welds for the type of part being assembled. If the number of detected welds is different from a number of expected welds, the part tracking system can tell the operator that too few or too many welds were performed.

However, conventional part tracking systems cannot tell an operator which particular welds were missed. The operator may have missed the third weld or the thirteenth weld. Both situations would appear identical to conventional part tracking systems. Additionally, if a particular weld is mistakenly missed, and another extraneous weld is accidentally added, the part tracking system may fail to realize there is anything at all wrong with the part, because the number of detected welds would still be equal to the number of expected welds.

The part tracking system described herein uses machine learning techniques to identify whether an operator has missed one or more welds when assembling a part. The part tracking system can additionally identify which specific welds were missed (e.g., the first weld, the third weld, the fifteenth weld, etc.). The part tracking system may be able to identify missing welds after a part has been completed, or in real-time, during part assemblys. Identification of the particular weld(s) missed during the welding process can help an operator quickly assess and resolve any issues with the part being produced, saving time and ensuring quality.

Some examples of the present disclosure relate to a system, comprising: processing circuitry; and memory circuitry comprising computer readable instructions which, when executed, cause the processing circuitry to: identify an initial weld of a part assembly process, access one or more first feature characteristics of the initial weld, access a typical part model representative of a part produced by the part assembly process with all required welds, determine whether the part includes an initial required weld based on a comparison of at least some of the first feature characteristics of the initial weld with at least some first typical feature characteristics associated with an initial typical weld of the typical part model, and in response to determining that the part does not include the initial required weld, output a notification.

In some examples, one or more machine learning techniques are used to determine whether the part includes the initial required weld. In some examples, the memory circuitry further comprises computer readable instructions which, when executed, cause the processing circuitry to: in response to determining that the part does not include the initial required weld, disable one or more pieces of welding equipment involved in the part assembly process. In some examples, accessing the typical part model comprises generating the typical part model using a collection of typical feature characteristics associated with welds that were used previously to create the part. In some examples, the typical part model comprises a neural net, a statistical model, or a data set collection. In some examples, the initial weld occurs first in time after a start of the part assembly process, and before any other weld in the part assembly process. In some examples, the memory circuitry further comprises computer readable instructions which, when executed, cause the processing circuitry to identify the start of the part assembly process based on data received from one or more sensors, a user interface, welding equipment, or a welding robot.

In some examples, the memory circuitry further comprises computer readable instructions which, when executed, cause the processing circuitry to: in response to determining that the part does include the initial required weld: identify a subsequent weld of the welding assembly process, wherein one or more second feature characteristics are associated with the subsequent weld, and determine whether the part includes a subsequent required weld based on a comparison of at least some of the second feature characteristics with at least some second typical feature characteristics associated with a subsequent typical weld of the typical part model. In some examples, the memory circuitry further comprises computer readable instructions which, when executed, cause the processing circuitry to: in response to determining that the part does not include the initial required weld: access one or more missing weld part models, each of the one or more missing weld part models being representative of the part with one or more missing welds, and determine an analogous missing weld part model of the one or more missing weld part models that is most similar to the part using one or more machine learning techniques, wherein the notification is representative of the one or more missing welds of the analogous missing weld part model. In some examples, each initial model weld of each missing weld part model of the one or more missing weld part models is associated with one or more first model feature characteristics, and the analogous missing weld part model is determined via a comparison of at least some of the one or more first feature characteristics associated with the initial weld with at least some of one or more first model feature characteristics associated with each initial model weld.

Some examples of the present disclosure relate to a method, comprising: identifying, via processing circuitry, an initial weld of a part assembly process; accessing one or more first feature characteristics of the initial weld; accessing a typical part model representative of a part produced by the part assembly process with all required welds; determining, via the processing circuitry, whether the part includes an initial required weld based on a comparison of at least some of the first feature characteristics of the initial weld with at least some first typical feature characteristics associated with an initial typical weld of the typical part model; and in response to determining that the part does not include the initial required weld, outputting a notification.

In some examples, one or more machine learning techniques are used to determine whether the part includes the initial required weld. In some examples, the method further comprises disabling one or more pieces of welding equipment involved in the part assembly process in response to determining that the part does not include the initial required weld. In some examples, accessing the typical part model comprises generating the typical part model using a collection of typical feature characteristics associated with welds that were used previously to create the part. In some examples, the typical part model comprises a neural net, a statistical model, or a data set collection. In some examples, the initial weld occurs first in time after a start of the part assembly process, and before any other weld in the part assembly process.

In some examples, the method further comprises identifying the start of the part assembly process, based on data received from one or more sensors, welding equipment, a welding robot, or a user interface. In some examples, the method further comprises: in response to determining that the part does include the initial required weld: identifying a subsequent weld of the welding assembly process, wherein one or more second feature characteristics are associated with the subsequent weld; and determining whether the part includes a subsequent required weld based on a comparison of at least some of the second feature characteristics with at least some second typical feature characteristics associated with a subsequent typical weld of the typical part model. In some examples, the method further comprises: in response to determining that the part does not include the initial required weld: accessing one or more missing weld part models, each of the one or more missing weld part models being a modified version of the typical part model representative of the part with one or more missing welds; and determining an analogous missing weld part model of the one or more missing weld part models that is most similar to the part using one or more machine learning techniques, wherein the notification is representative of the one or more missing welds of the analogous missing weld part model. In some examples, each initial model weld of each missing weld part model of the one or more missing weld part models is associated with one or more first model feature characteristics, and the analogous missing weld part model is determined via a comparison of at least some of the one or more first feature characteristics associated with the initial weld with at least some of one or more first model feature characteristics associated with each initial model weld.

FIG. 1 shows an example welding system 100 in communication with a tracking station 202. As shown, the welding system 100 includes a welding torch 118 and work clamp 117 coupled to a welding-type power supply 108 within a welding cell 101. As shown, the tracking station 202 is electrically coupled to (and/or in electrical communication with) the welding-type power supply 108. In some examples, the tracking station 202 may also be in communication with the welding torch 118 (e.g., via the welding-type power supply 108).

In the example of FIG. 1, an operator 116 is handling the welding torch 118 near a welding bench 112 within the welding cell 101. In some examples, the welding bench 112 may be and/or include a fixturing system configured to hold one or more workpiece(s) 110. In some examples the fixturing system may include one or more work clamps 117 (e.g., manual and/or pneumatic clamps). In some examples, the workpiece(s) 110 may be independent of a welding bench 112, such as, for example a freestanding element such as a structural steel element, pipeline, or bridge. While a human operator 116 is shown in FIG. 1, in some examples, the operator 116 may be (and/or control) a robot and/or automated welding machine.

In the example of FIG. 1, the welding torch 118 is coupled to the welding-type power supply 108 via a welding cable 126. The clamp 117 is also coupled to the welding-type power supply 108 via a clamp cable 115. The welding-type power supply 108 is, in turn, in communication with tracking station 202, such as via conduit 130. In some examples, the welding-type power supply 108 may alternatively, or additionally, include wireless communication capabilities (e.g., wireless communication circuitry), through which wireless communication may be established with tracking station 202. While shown as being in direct communication with tracking station 202, in some examples, the welding-type power supply 108 may be in communication with tracking station 202 through a network (e.g., the Internet, a wide access network, local access network, etc.).

In the example of FIG. 1, the welding torch 118 is a gun configured for gas metal arc welding (GMAW). In some examples, the welding torch 118 may comprise an electrode holder (i.e., stinger) configured for shielded metal arc welding (SMAW). In some examples, the welding torch 118 may comprise a torch and/or filler rod configured for gas tungsten arc welding (GTAW). In some examples, the welding torch 118 may comprise a gun configured for flux-cored arc welding (FCAW). In some examples, the welding torch 118 may additionally, or alternatively, comprise a filler rod. In some examples, the welding torch 118 may comprise a robotic welding torch 118, moved and/or actuated by a robot, rather than n operator 116. In the example of FIG. 1, the welding torch 118 includes a trigger 119. In some examples, the trigger 119 may be actuated by the operator 116 to activate a welding-type operation (e.g., arc).

In the example of FIG. 1, the welding-type power supply 108 includes (and/or is coupled to) a wire feeder 140. In some examples, the wire feeder 140 houses a wire spool that is used to provide the welding torch 118 with a wire electrode (e.g., solid wire, cored wire, coated wire). In some examples, the wire feeder 140 further includes motorized rollers configured to feed the wire electrode to the torch 118 (e.g., from the spool) and/or retract the wire electrode from the torch 118 (e.g., back to the spool).

In the example of FIG. 1, the welding-type power supply 108 also includes (and/or is coupled to) a gas supply 142. In some examples, the gas supply 142 supplies a shielding gas and/or shielding gas mixtures to the welding torch 118 (e.g., via cable 126). A shielding gas, as used herein, may refer to any gas (e.g., CO2, argon) or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth).

In the example of FIGS. 1 and 2, the welding-type power supply 108 also includes an operator interface 144. In the example of FIG. 1, the operator interface 144 comprises one or more adjustable inputs (e.g., knobs, buttons, switches, keys, etc.) and/or outputs (e.g., display screens, lights, speakers, etc.) on the welding-type power supply 108. In some examples, the operator interface 144 may comprise a remote control and/or pendant. In some examples, the operator 116 (and/or other user) may use the operator interface 144 to enter and/or select one or more weld parameters (e.g., voltage, current, gas type, wire feed speed, workpiece material type, filler type, etc.) and/or weld operations for the welding-type power supply 108. In some examples, the operator interface 144 may further include one or more receptacles configured for connection to (and/or reception of) one or more external memory devices (e.g., floppy disks, compact discs, digital video disc, flash drive, etc.).

In the example of FIG. 1, the welding-type power supply 108 includes power conversion circuitry 132 configured to receive input power (e.g., from mains power, a generator, etc.) and convert the input power to welding-type output power. In some examples, the power conversion circuitry 132 may include circuit elements (e.g., transformers, rectifiers, capacitors, inductors, diodes, transistors, switches, and so forth) capable of converting the input power to output power. In some examples, the power conversion circuitry 132 may also include one or more controllable circuit elements. In some examples, the controllable circuit elements may comprise circuitry configured to change states (e.g., fire, turn on/off, close/open, etc.) based on one or more control signals. In some examples, the state(s) of the controllable circuit elements may impact the operation of the power conversion circuitry 132, and/or impact characteristics (e.g., current/voltage magnitude, frequency, waveform, etc.) of the output power provided by the power conversion circuitry 132. In some examples, the controllable circuit elements may comprise, for example, switches, relays, transistors, etc. In examples where the controllable circuit elements comprise transistors, the transistors may comprise any suitable transistors, such as, for example MOSFETs, JFETs, IGBTs, BJTs, etc.

In the example of FIG. 1, the welding-type power supply 108 further includes control circuitry 134 electrically coupled to and configured to control the power conversion circuitry 132. In some examples, the control circuitry 134 may include processing circuitry (and/or one or more processors) as well as analog and/or digital memory. In some examples, the control circuitry 134 is configured to control the power conversion circuitry 132, to ensure the power conversion circuitry 132 generates the appropriate welding-type output power for carrying out the desired welding-type operation.

In some examples, the control circuitry 134 is also electrically coupled to and/or configured to control the wire feeder 140 and/or gas supply 142. In some examples, the control circuitry 134 may control the wire feeder 140 to output wire at a target speed and/or direction. For example, the control circuitry 134 may control the motor of the wire feeder 140 to feed wire to (and/or retract the wire from) the torch 118 at a target speed. In some examples, the welding-type power supply 108 may control the gas supply 142 to output a target type and/or amount of gas. For example, the control circuitry 134 may control a valve in communication with the gas supply 142 to regulate the gas delivered to the welding torch 118.

In the example of FIG. 1, the welding system 100 further includes several sensors 150. In some examples, one or more of the sensors 150 may comprise one or more of a current sensor, a voltage sensor, a magnetic field sensor, a resistance sensor, a wire feed speed sensor, a gas flow sensor, a clamping sensor, an NFC interrogator, an RFID interrogator, a Bluetooth interrogator, a barcode reader, a camera, an optical sensor, an infrared sensor, an acoustic sensor, a sound sensor, a microphone, a position sensor, a global positioning system (GPS) unit, an accelerometer, an inertial measurement unit, an x-ray sensor, a radiographic sensor, a torque sensor, a non-destructive testing sensor, a temperature sensor, and/or a humidity sensor. As shown, the sensors 150 are positioned in, on, and/or proximate to the work clamp 117, welding torch 118, welding-type power supply 108, wire feeder 140, gas supply 142, and power conversion circuitry 132.

In the example of FIG. 1, a sensor 150 is also shown mounted to and/or hanging from a fixture (e.g., wall, door, ceiling, pillar, curtain, etc.) of the welding cell 101. While only one sensor 150 is shown mounted to and/or hanging from a fixture, in some examples, multiple sensors 150 may be mounted to and/or hung from a fixture. As shown, multiple sensors 150 are also mounted to and/or hanging from an unattended robot vehicle 152 (e.g., a drone). While the robot vehicle 152 is an aerial vehicle in the example of FIG. 1, in some examples, the robot vehicle 152 may instead be a ground vehicle or an aquatic vehicle.

In some examples, the sensors 150 may be configured to sense, detect, and/or measure various data of the welding system 100. For example, the sensors 150 may sense, detect, and/or measure data such as one or more locations, positions, and/or movements of the operator 116, welding torch 118, workpiece 110, and/or other objects within the welding cell 101. As another example, the sensors 150 may sense, detect, and/or measure data such as air temperature, air quality, electromagnetism, and/or noise in the welding cell 101. As another example, the sensors 150 may sense, detect, and/or measure data such as a voltage and/or current of the power received by the welding-type power supply 108, power conversion circuitry 132, and/or welding torch 118, and/or the voltage and/or current of the power output by the welding-type power supply 108 and/or power conversion circuitry 132. As another example, the sensors 150 may sense, detect, and/or measure data such as a velocity (e.g., speed and/or feed direction) of the wire feeder 140 and/or type of wire being fed by the wire feeder 140. As another example, the sensors 150 may sense, detect, and/or measure data such as a gas type and/or gas flow (e.g., through a valve) from the gas supply 142 to the welding torch 118. As another example, the sensors 150 may sense, detect, and/or measure data such as a trigger signal (e.g., actuation, de-actuation, etc.) of the welding torch 118, and/or a clamping signal (e.g., clamp, unclamp, etc.) of the clamp 117.

In some examples, the sensors 150 may be configured to communicate data sensed, detected, and/or measured to the welding-type power supply 108 and/or tracking station 202. In some examples, the control circuitry 134 may be in communication with some or all of the sensors 150 and/or otherwise configured to receive information from the sensors 150. In some examples, the tracking station 202 may be in communication with some or all of the sensors 150 and/or otherwise configured to receive information from the sensors 150 (e.g., through the control circuitry 134).

In some examples, a welding operation (and/or welding process) may be initiated when the operator 116 actuates the trigger 119 of the welding torch 118 (and/or otherwise activates the welding torch 118). During the welding operation, the welding-type power provided by the welding-type power supply 108 may be applied to the electrode (e.g., wire electrode) of the welding torch 118 in order to produce a welding arc between the electrode and the one or more workpieces 110. The heat of the arc may melt portions of a filler material (e.g., wire) and/or workpiece 110, thereby creating a molten weld pool. Movement of the welding torch 118 (e.g., by the operator) may move the weld pool, creating one or more welds 111.

When the welding operation is finished, the operator 116 may release the trigger 119 (and/or otherwise deactivate/de-actuate the welding torch 118). In some examples, the control circuitry 134 may detect that the welding operation has finished. For example, the control circuitry 134 may detect a trigger release signal via sensor 150 (and/or from torch 118 directly). As another example, the control circuitry 134 may receive a torch deactivation command via the operator interface 144 (e.g., where the torch 118 is maneuvered by a robot and/or automated welding machine).

In some examples, the sensors 150 may detect data pertaining to the welding-type power supply 108, clamp 117, bench 112, and/or welding torch 118 during a welding process. In some examples, the welding-type power supply 108 may also detect certain data (e.g., entered via the operator interface 144, detected by control circuitry 134, etc.). In some examples, the sensors 150 and/or welding-type power supply 108 may be configured to communicate this data to the tracking station 202 (directly and/or through welding-type power supply 108). In some examples, the data may be communicated to the tracking station 202 in real time, periodically during a welding operation, and/or after a welding operation. In some examples, the tracking station 202 may be embodied and/or implemented within the welding-type power supply 108 (e.g., via control circuitry 134)

The data collected by the sensors 150, power supply 108, and/or other portions of the welding system 100 can be valuable. For example, the data may be analyzed to automatically identify a beginning and/or end of a part assembly process that consists of several welds. Additionally, the data may be analyzed to automatically identify individual welds of a part assembly process, and/or determine feature characteristics of those welds.

Figure 2A:
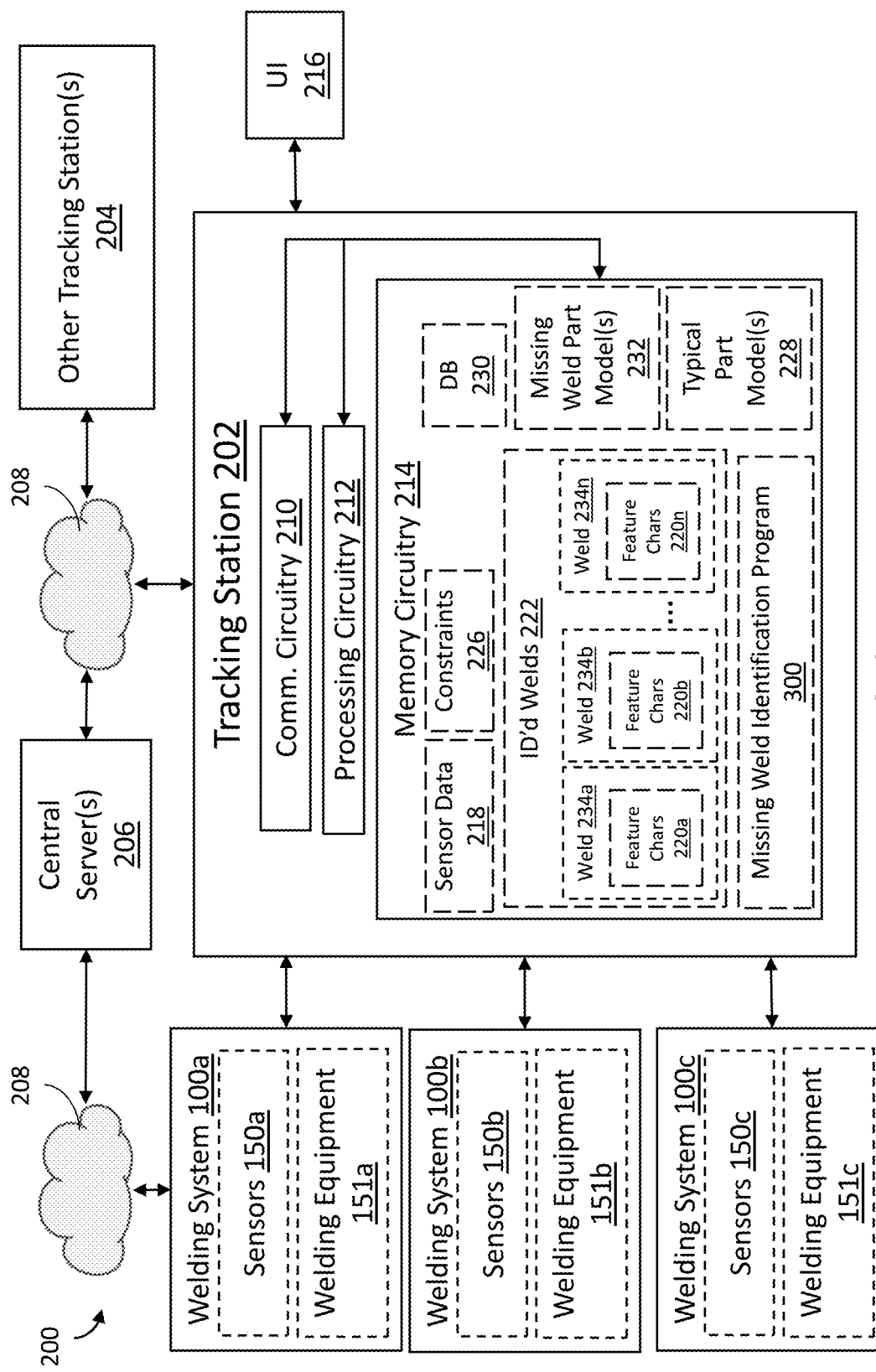
FIG. 2a is a block diagram showing an example of a part tracking system, including several of the welding systems of FIG. 1, in accordance with aspects of this disclosure.

FIG. 2a is a block diagram showing an example part tracking system 200. As shown, the part tracking system 200 includes the part tracking station 202, as well as several welding systems 100 (each having sensors 150 and welding equipment 151) in communication with the part tracking station 202. In the example of FIG. 2a, the part tracking system 200 further includes one or more central servers 206, and one or more other tracking stations 204.

In the example of FIG. 2a, the tracking station 202 is electrically (and/or communicatively) coupled to the sensors 150 and/or welding equipment 151 (e.g. power supplies 108, torches 118, clamps 117, etc.) of each welding system 100. While three welding systems 100 are shown in the example of FIG. 2a, in some examples, there may be more or less welding systems 100. In some examples, the tracking station 202 (and/or central server(s) 206) may receive data from the system(s) 100 continuously, periodically, and/or on demand.

In the example of FIG. 2a, the tracking station 202 is electrically (and/or communicatively) coupled to a user interface (UI) 216. In some examples, the UI 216 may comprise one or more input devices (e.g., touch screens, mice, keyboards, buttons, knobs, microphones, dials, etc.) and/or output devices (e.g., display screens, speakers, lights, etc.). In some examples, the UI 216 may further include one or more receptacles configured for connection to (and/or reception of) one or more external memory devices (e.g., floppy disks, compact discs, digital video disc, flash drive, etc.). In operation, an operator 116 or other user may provide input to, and/or receive output from, the tracking station 202 via the UI 216. While shown as a separate component in the example of FIG. 2a, in some examples, the UI 216 may be part of the tracking station 202.

In the example of FIG. 2a, the tracking station 202 is in communication with one or more other tracking stations 204 and one or more central servers 206 through network 208 (e.g., the Internet, a wide access network, local access network, etc. As shown, the sensors 150a and welding equipment 151a of welding system 100a are also in communication with the central server(s) 206 through a network 208. While only one welding system 100a is shown as being communicatively coupled to the central server(s) 206 through the network 208, in some examples, all, some, or none of the welding systems 100 may be communicatively coupled to the central server(s) 206 through the network 208. In some examples, the tracking station 202 may be in communication with the one or more other tracking stations 204 and/or the one or more central servers 206 directly, rather than through the network 208. In some examples, the welding system 100a may be in communication with the central server(s) 206 directly, rather than through the network 208. In some examples, the central server(s) 206 may be implemented via the tracking station 202 and/or one or more of the other tracking stations 204. In some examples, one or more of the other tracking station(s) 204 may be tracking stations 200 that are remotely located.

In the example of FIG. 2a, the tracking station 202 includes communication circuitry 210, processing circuitry 212, and memory circuitry 214, interconnected with one another via a common electrical bus. In some examples, the processing circuitry 212 may comprise one or more processors. In some examples, the communication circuitry 210 may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry 210 may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.). In some examples, the tracking station 202 may be implemented by way of a desktop computer, laptop computer, computer server, and/or welding-type power supply 108 (e.g., via control circuitry 134).

In the example of FIG. 2a, the memory circuitry 214 stores sensor data 218 received from sensors 150. As shown, the memory circuitry 214 also stores several identified welds 222 (e.g., identified from the sensor data 218). As shown, each weld 234 of the identified welds 222 includes feature characteristics 220 (e.g., extracted from the sensor data 218). In some examples, feature characteristics 220 of a weld 234 may include, for example, duration of a weld 234, start date/time, end date/time, operator (e.g., name, ID), voltage, current, and/or other relevant features and/or characteristics of the weld 234 (further discussed below).

In the example of FIG. 2a, the memory circuitry 214 stores a missing weld identification program 300. In some examples, the missing weld identification program 300 may determine whether any welds 234 are missing from the identified welds 222, and/or which specific welds 234 are missing. As shown, the memory circuitry 214 additionally stores one or more typical part model(s) 228 (e.g., developed and/or used by a missing weld identification program 300), and one or more missing weld part models 232 (e.g., developed from the typical part model(s) 228 and/or used by the missing weld identification program 300).

In the example of FIG. 2a, the memory circuitry 214 further stores certain constraints 226. In some examples, the constraints 226 may be used by the missing weld identification program 300 to determine which feature characteristic(s) 220, typical part model(s) 228, and/or missing weld part model(s) 232 to use. In some examples, the constraints 226 may be preset, downloaded (e.g., from the central server(s) 206), user entered, and/or otherwise obtained. As shown, the memory circuitry 214 further stores a database (DB) 230 (e.g., used to organize and/or store data, such as, for example, the sensor data 218, identified welds 222, typical part models 228, missing weld part models 232, constraints 226, etc.).

While shown as stored in memory circuitry 214 in the example of FIG. 2a, in some examples, the sensor data 218, feature characteristics 220, identified welds 222, typical part model(s) 228, missing weld part model(s) 232, and/or constraints 226 may alternatively, or additionally, be stored in the DB 230, in memory circuitry of the central server(s) 206, and/or in memory circuitry of other tracking station(s) 204. While shown as stored in memory circuitry 214 of the tracking station 202 in the example of FIG. 2a, in some examples, all or some of the missing weld identification program 300 may be stored in memory circuitry of the central server(s) 206, and/or executed by processing circuitry of the central server(s) 206. While shown as stored in the memory circuitry 214 of the tracking station 202 in FIG. 2a, in some examples, the DB 230 may alternatively, or additionally be stored in memory circuitry of the central server(s) 206 and/or other tracking station(s) 204. For the sake of convenience, future references to memory circuitry 214 of the tracking station 202, memory circuitry of the central server(s) 206, and/or memory circuitry 214 of other tracking stations 204 may be referred to collectively as memory.

Figure 2B:
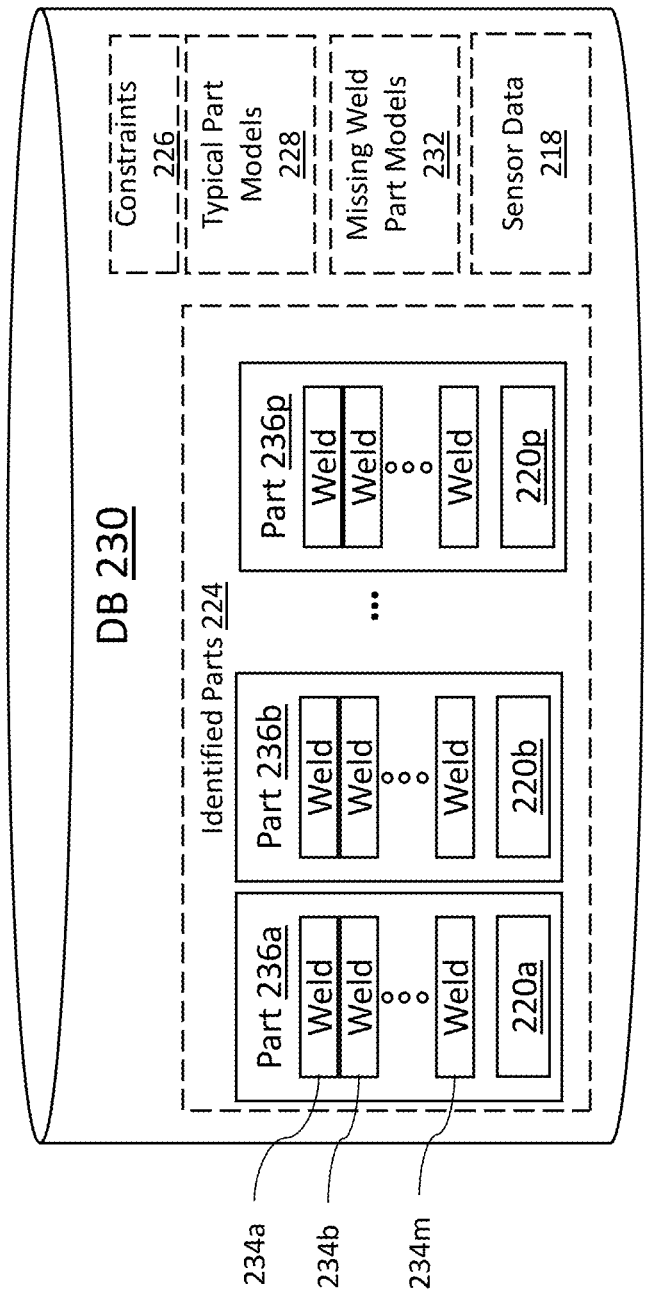
FIG. 2b is a block diagram showing an example database of the part tracking system of FIG. 2a, in accordance with aspects of this disclosure.

FIG. 2b is a block diagram showing more detail of an example DB 230. In the example of FIG. 2b, the DB 230 stores sensor data 218, typical part models 228, missing weld part models 232, identified parts 224, and constraints 226. As shown, the identified parts 224 comprise a plurality of parts 236, with each part 236 including several welds 234. Though not shown in FIG. 2b to save space, each weld 234 may be associated with its own feature characteristics 220, such as shown with respect to the identified welds 222 in FIG. 2a. As shown, each part 236 may also be associated with its own part specific feature characteristics 220. In some examples, the identified parts 224 may be continuously and/or periodically updated with data from newly assembled parts 236.

In some examples, the missing weld identification program 300 may analyze data collected by the sensors 150, operator interface 144, and/or welding equipment 151 of a welding system 100, as well as data collected via the UI 216 (collectively referred to hereinafter as sensor data 218). In some examples, the sensor data 218 may be used to identify a start and/or end of a part assembly process, as well welding activity that occurs during the part assembly process (e.g., via signal(s) representative of clamp activation and/or release, a trigger pull/release, voltage/current detection, etc.). In some examples, time periods of welding activity may be identified as welds 234 (e.g., of the identified welds 222). In some examples, identified welds 234 that occur between the start and end of a part assembly process may be associated with a part 236 and saved in memory and/or the DB 230 with the identified parts 224. In some examples, the missing weld identification program 300 may determine certain feature characteristics 220 based on the analysis of the sensor data 218, and associate relevant feature characteristics 220 with each weld 234 of the identified welds 222 and/or part 236 of the identified parts 224.

In some examples, the missing weld identification program 300 may analyze the welds 234 (e.g., the identified welds 222) of a part 236 to determine if there are any welds 234 missing, and/or which specific welds 234 are missing. For example, the missing weld identification program 300 may compare the identified welds 222 of a newly assembled part 236 with welds 234 of a typical part model 228 to determine if there are any welds 234 missing. If welds 234 are missing, the missing weld identification program 300 may analyze the analyze the part 236 in view of one or more missing weld part models 232 to determine the particular missing weld(s) 234. Identification of a missing weld 234 during part assembly enables an operator 116 to quickly identify and/or address the issue, saving time and ensuring quality.

Figure 3A:
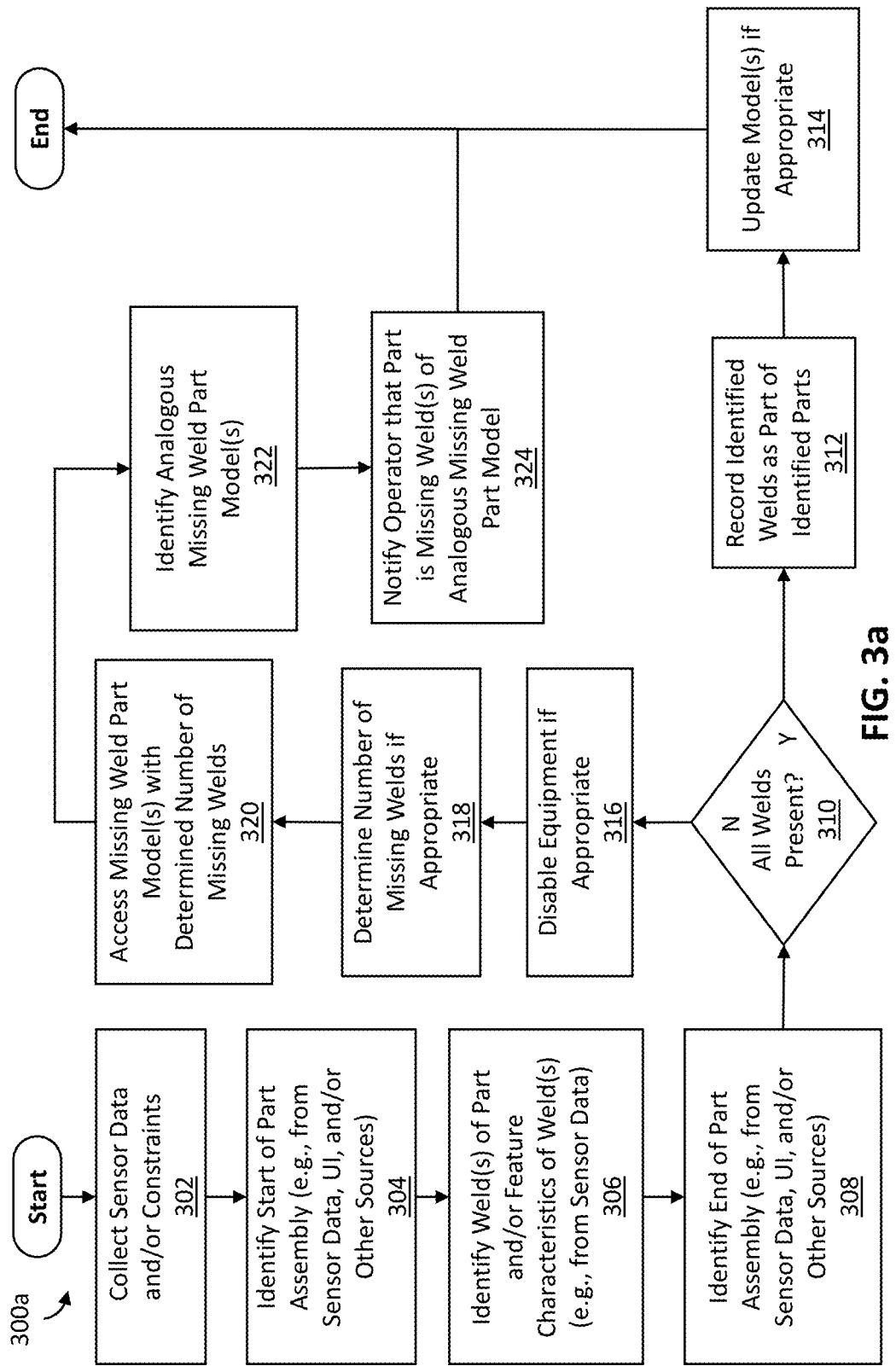
FIG. 3a is flow diagrams illustrating an example missing weld identification program for identifying missing welds of a completed part, in accordance with aspects of this disclosure.
Figure 3B:
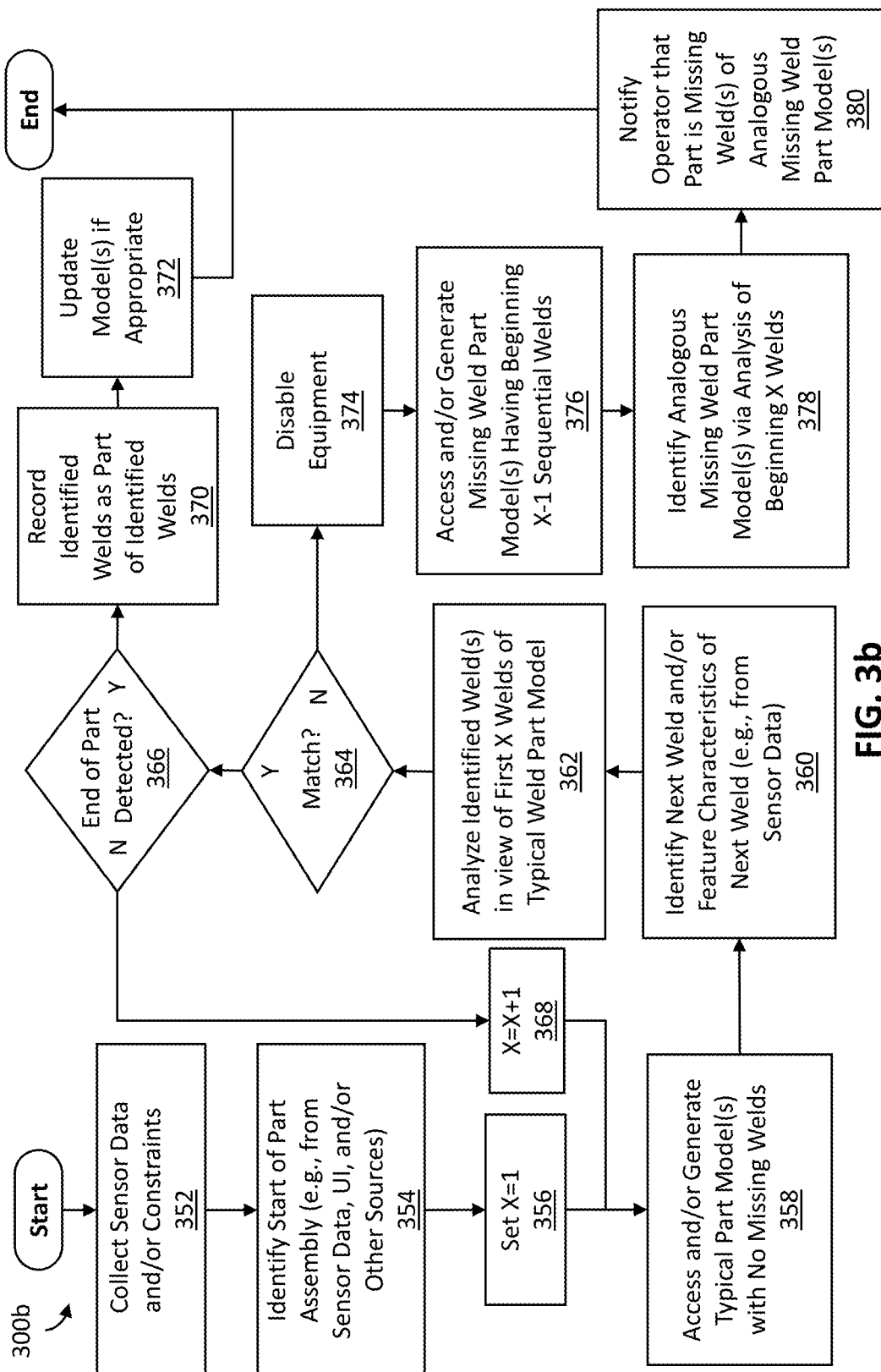
FIG. 3b is a flow diagram illustrating an example missing weld identification program for identifying missing welds of an in-progress part, in accordance with aspects of this disclosure.

FIGS. 3a and 3b are flowcharts illustrating an example missing weld identification program 300. In some examples, the missing weld identification program 300 may be implemented in machine readable (and/or processor executable) instructions stored in memory and/or executed by processing circuitry. FIG. 3a is an example of a post part missing weld identification program 300a. FIG. 3b is an example of an in-progress part missing weld identification program 300b. In some examples, the missing weld identification programs 300 may execute sequentially or in parallel. In some examples, only one missing weld identification program 300 may execute. In some examples, the part tracking system 200 may decide to execute the missing weld identification program 300a and/or missing weld identification program 300b based on one or more user inputs and/or constraints 226.

In the example of FIG. 3a, the missing weld identification program 300a begins at block 302. At block 302, the missing weld identification program 300a collects sensor data 218 (e.g., from sensors 150, welding equipment 151, and/or UI 216). At block 320, the missing weld identification program 300a also collects constraints 226 (e.g., from UI 216 and/or DB 230). In some examples, the constraints 226 may comprise information that may assist the part tracking system 200 in deciding to execute the missing weld identification program 300a and/or missing weld identification program 300b. In some examples, the constraints 226 may comprise information that may assist the missing weld identification program 300a in generating and/or selecting one or more typical part models 228 and/or missing weld part models 232. In some examples, constraints 226 may include such information as, for example, the current operator, shift, fixture, time of day, day of the week, type/make/model of equipment, maintenance schedule, environmental conditions, and/or other pertinent information. In some examples, this data may alternatively, or additionally, be obtained via a lookup in memory based on sensor data 218 and/or other information (e.g., an internal clock of the tracking station 202 and/or central server(s) 206.

In some examples, the sensor data 218 and/or constraints 226 may be stored in the DB 230 and/or memory. While shown in the example of FIG. 3a for the sake of understanding, in some examples, the collection of sensor data 218 and/or constraints 226 may happen outside of the context of the missing weld identification program 300a. While shown as taking place at the beginning of the missing weld identification program 300a in the example of FIG. 3a for the sake of understanding, in some examples, the collection of sensor data 218 and/or constraints 226 may happen at other times. In some examples, additional data may also be collected at block 302 (e.g., event data).

In the example of FIG. 3a, the missing weld identification program 300a proceeds to block 304 after block 302. At block 304, the missing weld identification program 300a identifies a start of a part assembly process. In some examples, the missing weld identification program 300a may identify the start of the part assembly process based on user input (e.g., via UI 216). For example, an operator 116 may provide input indicating that they are about to begin a part assembly process. In some examples, the missing weld identification program 300a may identify the start of the part assembly process based on sensor data 218. For example, clamp 117 (and/or sensor 150 coupled to, in communication with, and/or proximate to clamp 117) may provide a signal indicative of a clamping event and/or activation of the clamp 117. As another example, a sensor 150 may scan, read, and/or otherwise obtain information from a barcode, QR code, RFID device, NFC device, Bluetooth device, and/or other media indicative of the start of a part assembly process. In some examples, the missing weld identification program 300a may additionally obtain information relating to the type of part being assembled at block 304, such as, for example, via the same mechanism through which the beginning of the part assembly process is identified.

In the example of FIG. 3a, the missing weld identification program 300a proceeds to block 306 after block 304. At block 306, the missing weld identification program 300a identifies one or more individual welds 234 of the part assembly process based on the collected sensor data 218. In some examples, this identification may comprise identifying a start and/or an end of each weld 234. For example, the missing weld identification program 300a may analyze sensor data 218 representative of a trigger 119 pull/release, wire feed speed increase/decrease, gas flow increase/decrease, etc. at a certain time, and determine based on the sensor data 218 that a weld 234 began or ended at that time. Once a start and end of a weld 234 is identified, the missing weld identification program 300a may associate sensor data 218 obtained between the start and end of the weld 234 with the weld 234 in memory as part of the identified welds 222.

At block 306, the missing weld identification program 300a additionally analyzes the sensor data 218 associated with each weld 234 to determine one or more feature characteristics 220 of each identified weld 222. For example, the missing weld identification program 300a may determine a weld start time feature characteristic of a weld 234 and a weld end time feature characteristic of the weld 234 based on timestamp information and the previously identified start and end of the weld 234. As another example, the missing weld identification program 300a may determine a weld duration of the weld 234 based on the difference between the weld start time and weld end time. As another example, the missing weld identification program 300a may determine an average (and/or time series values of) voltage, current, wire feed speed, gas flow rate, work angle, torch travel speed, torch travel angle, weld temperature, ambient humidity, and/or ambient temperature over the duration of the weld 234 (e.g., based on sensor data 218). As another example, the missing weld identification program 300 may determine the relevant operator 116, gas type, wire type, workpiece material type, and/or location of the weld 234 (e.g., based on sensor data 218). In some examples, the missing weld identification program 300 may save these feature characteristics 220 as part of the weld 234, and/or otherwise associate the feature characteristics 220 with the weld 234.

In some examples, feature characteristics 220 of a weld 234 may comprise one or more of a weld start time, a weld end time, a weld duration, a weld type, a weld identifier, a weld class, a weld procedure, a voltage, a current, a wire feed speed, a gas flow, a torch travel speed, a torch travel angle, a work angle, weld coordinates, a weld temperature, a weld property measurement, weld inspection data, a shift start time, a shift end time, an operator identifier, an operator name, an operator qualification, workpiece material preparation information, a workpiece material type, a wire type, a filler material property, a gas type, an assembly location, an ambient temperature, an ambient humidity, a false weld/arc flag (e.g., if weld duration is below a threshold), an ignore weld flag (e.g., if some input provided directing system to ignore), a total deposited wire/filler amount, a total gas amount used, a weld pass number, a weld confidence metric, a weld quality metric, a previous event type (e.g., weld, operator login, equipment fault, tip change, shift start/end, break start/end, etc.), a time since last weld, a time until next weld, a previous workflow event (e.g., perform maintenance), a job type, an image of an operational environment, and/or an image of the welding-related operation.

In the example of FIG. 3a, the missing weld identification program 300a proceeds to block 308 after block 306. At block 308, the missing weld identification program 300a identifies an end to the part assembly process that was begun at block 304. In some examples, the missing weld identification program 300a may identify the end of the part assembly process based on user input and/or sensor data 218, similar to that which is described above with respect to identifying the start of the part assembly process at block 304.

In some examples, the welds 234 identified at block 306 may be associated together as (and/or with) a part 236 once the part assembly process ends at block 308. In some examples, feature characteristics 220 be determined for and/or associated with the part 236 as well, in addition to the feature characteristics 220 of the welds 234 of the part 236. In some examples, the feature characteristics 220 for the part 236 may be determined based on constraints 226, sensor data 218 collected during (and/or before/after) the part assembly process, the feature characteristics 220 of the welds 234 identified during the part assembly process, and/or other information.

In some examples, feature characteristics 220 specific to a part 236 may include one or more of a part assembly start time, a part assembly end time, a part assembly duration, a number of expected welds, a number of completed welds, a number of false arcs, a number of ignored welds, a number of extra welds, a number of missing welds, a clamp time, a cycle time, a total deposited wire/filler amount, a total arc time, a total gas amount used, a part property measurement, part inspection data, a shift start time, a shift end time, an operator identifier, an operator name, an operator qualification, and/or a job type. In some examples, the missing weld identification program 300a may associate and/or store part specific feature characteristics 220 with the part 236 (along with the welds 234 of the part 236) in memory and/or the DB 230 (as part of the identified parts 224). In some examples, the missing weld identification program 300a may delay associating and/or storing the part 236 with the identified parts 224 until after the missing weld identification program 300a verifies that all expected and/or required welds 234 of the part 236 were properly completed and/or identified.

While shown in the example of FIG. 3a for the sake of understanding, in some examples, blocks 302-308 may happen outside of the context of the missing weld identification program 300a. For example, in some cases blocks 302-308 may occur many times, over the course of many part assembly processes, before the rest of the missing weld identification program 300a executes. However, in other examples, blocks 302-308 may occur immediately prior to the remaining portions of the missing weld identification program 300a.

In the example of FIG. 3a, the missing weld identification program 300a proceeds to block 310 after block 308. At block 310, the missing weld identification program 300a determines whether the identified welds 222 of the newly assembled part 236 include all the expected and/or required welds 234 for that type of part 236. In some examples, this may be a relatively simple determination. For example, the missing weld identification program 300a may determine the number of identified welds 222 for that part 236 by counting the number of welds 234 of the identified welds 222 (and/or examining the corresponding feature characteristic 220 of the part 236). Additionally, the missing weld identification program 300a may obtain information relating to the type of part 236 being assembled at block 302 and/or block 304. Thereafter, the missing weld identification program 300a may determine a required and/or expected number of welds 234 for the part 236, based on its type, such as, for example, via a lookup in memory. In some examples, the actual and/or required/expected number of welds 234 may additionally, or alternatively, be a feature characteristics 220 of the part 236. Thus, one way the missing weld identification program 300a may determine whether all the expected/required welds 234 for the part 236 were completed and/or identified is to compare the number of identified welds 222 of the new part 234 with the expected/required number of welds 234.

While a numerical comparison may be relatively simple and effective method of determining whether the new part 236 includes all the expected/required welds 234, it may also be prone to error in some cases. For example, an operator 116 might miss an expected/required weld 234, but perform an extra weld 234, in which case the actual number of welds 234 would still be the same as the number of expected/required welds 234, even though an expected/required weld 234 was missed. Thus, in some examples, the missing weld identification program 300a may undertake a more thorough determination of whether the new part 236 includes all expected and/or required welds 234.

In some examples, the missing weld identification program 300a may analyze the newly identified welds 222 of the new part 236 in view of an appropriate typical part model 228 (corresponding to the same type of part 236) to determine whether the new part 236 includes all the expected/required welds 234. In some examples, welds 234 performed (correctly) at the same sequence step of a part assembly process often have similar feature characteristics 220 (assuming the same type of part 236). Thus, by analyzing many parts 236 of the same type, a typical part model 228 may be generated that is representative of an average, normal, and/or typical part 236 of a particular type with all expected/required welds 234. In some examples, the typical part model(s) 228 may be generated at block 310. In some examples, the typical part model(s) 228 may be generated prior to block 310, and simply accessed from memory at block 310.

In some examples, several different typical part models 228 may be generated for the same type of part 236. In such an example, each of the different typical part models 228 may be generated using slightly different sets of data. For example, one typical part model 228 may be generated using only data corresponding to one or more particular shifts, operators, pieces of equipment, months of the year, days of the week, hours of the day, maintenance schedules, work cell conditions, and/or other variables. In some examples, the missing weld identification program 300a may choose one particular typical part model 228 to use at block 310 based on set/saved parameters, user input, and/or one or more constraints 226.

In some examples, a typical part model 228 may be a neural net, a statistical model, or a data set collection. In examples where the typical part model 228 is a neural net, the neural net may be trained using previously identified parts 224 (of a particular part type) with no missing welds 234. In some examples, only certain feature characteristics 220 may be used for the training (e.g., based on set/saved parameters, user input, and/or one or more constraints 226). Once sufficiently trained, the missing weld identification program 300a may input to the neural net the identified welds 222 of a new part 236. The neural net, in turn, may analyze the feature characteristics 220 of the identified welds 222 and output a probability that the identified welds 222 comprise a part 236 of the same part type with no missing (or extra) welds. In some examples, if the probability is below a certain threshold (e.g., saved in memory and/or specified via the constraints 226), the missing weld identification program 300a may determine that the new part 236 does not include all the expected/required welds 234. On the other hand, if the probability is above the threshold, the missing weld identification program 300a may determine that the new part 236 does include all the expected/required welds 234. In some examples, only certain feature characteristics 220 may be evaluated by the neural net (e.g., based on set/saved parameters, user input, and/or one or more constraints 226).

In examples where the typical part model 228 is a statistical model, the statistical model may be a single part 236 compiled from statistical analysis of many different identified parts 224 (of the appropriate part type) with no missing (or extra) welds 234. In some examples, each weld 234 of the statistical model may have feature characteristics 220 compiled from statistical analysis of the many different corresponding welds 234 of the different identified parts 224. Thus, the feature characteristics 220 of each weld 234 in the statistical model may comprise an average and/or standard deviation of the feature characteristics 220 of the welds 234 of the different identified parts 224. In some examples, the missing weld identification program 300a may compare the feature characteristics 220 of each weld 234 of the statistical model to each corresponding weld 234 (i.e., weld 1, weld 2, weld 3, etc.) of the newly assembled part 236. In some examples, the comparison may be performed using a statistical analysis, such as, for example, a Bayesian statistical analysis. In some examples, only certain feature characteristics 220 may be evaluated by the statistical analysis (e.g., based on set/saved parameters, user input, and/or one or more constraints 226).

In some examples, the result of the statistical analysis may be a probability that that the new part 236 has no missing (or extra) welds 234. In some examples, the missing weld identification program 300a may determine that the new part 236 has no missing welds 234 if the statistical probability is above a threshold, and determine that the new part 236 does have missing welds 234 if the probability is below the threshold. In some examples, the statistical analysis may determine a degree to which each new weld 234 of the new part 236 matches its corresponding weld 234 in the statistical model. In some examples, the probability that that the new part 236 has no missing (or extra) welds 234 may be determined based on degree to which each new weld 234 of the new part 236 matches its corresponding weld 234 in the statistical model.

In examples where the typical part model 228 is a data set collection, the data set collection may be a collection of previously identified parts 224 (of the same part type). In some examples, the data set collection may include parts 236 with no missing welds 234 and parts 236 with one or more missing welds 234. In some examples, real world data for parts 236 with one or more missing welds 234 may be difficult to obtain, so the missing weld identification program 300a may create parts 236 with missing welds 234 from parts 236 with no missing welds 234 by making a duplicate part 236 and removing one or more of the welds 234 of the duplicate part 236. In some examples, the missing weld identification program 300a may remove different welds 234 from different duplicate parts 236, to create different (and/or all) possible permutations of a part 236 with one or more missing welds 234. In some examples, the missing weld identification program 300a may decline to create parts 236 with more than a saved and/or set threshold number or percentage (e.g., 20, 25%, etc.) of missing welds 234 for reasons of practicality (e.g., problem may be too big to fix if above threshold anyway) and/or in order to save processing time.

In some examples, the missing weld identification program 300a may perform one or more distance calculations as part of a K nearest neighbor (KNN) analysis. In some examples, the missing weld identification program 300a may determine which K (e.g., 5, 10, 15, etc.) parts 236 of the data set collection are "nearest" to the new part 236 using the distance calculation(s). In some examples, K may be a default value stored in memory. In some examples, the part tracking program 300 may determine K based user input and/or on one or more constraints 226. In some examples, the distance calculation(s) and/or KNN analysis may be performed using feature characteristics 220 of the different welds 234 in the part 236 and the data set collection. In some examples, only certain feature characteristics 220 may be analyzed (e.g., based on set/saved parameters, user input, and/or one or more constraints 226).

In some examples, the missing weld identification program 300a may determine what parts 236 make up the majority of the K "nearest" parts 236. In some examples, the missing weld identification program 300a may require a part 236 be within a (e.g., set and/or saved) threshold distance in order to be considered "nearest." In some examples, the missing weld identification program 300a may determine that the new part 236 has no missing welds 234 if at least a (set and/or saved) threshold number (and/or percentage) of the K nearest parts 236 have no missing welds, and determine that the new part 236 does have missing welds 234 if otherwise. In some examples, the missing weld identification program 300a may determine that the new part 236 has no missing welds 234 if the majority of the K nearest parts 236 have no missing welds, and determine that the new part 236 does have missing welds 234 if otherwise.

In some examples, the missing weld identification program 300a may account for one or more suspected extra welds 234 of a part 236 by simply skipping (and/or ignoring) the suspected extra weld 234 during analysis. For example, if a part 236 has more welds 234 than a typical part model 228 (and/or a typical part 236 with no missing welds 234), the missing weld identification program 300a may skip/ignore different permutations of welds 234 in the part 236 when analyzing against a typical part model 228. In some examples, the missing weld identification program 300a may decide to skip/ignore a weld 234 based on one or more feature characteristics 220 of the weld 234 (e.g., the false/ignore weld flags). In some examples, the missing weld identification program 300a may record (e.g., in memory) and/or provide one or more notifications (e.g., via UI 216) representative of identified extra welds 234. In some examples, the missing weld identification program 300a may still proceed from block 310 to block 312 if the part 236 has one or more extra welds 234, but no missing welds 234 (but may not be used to update models at block 314).

FIG. 4a is a diagram illustrating simple examples of welds 234 (e.g., identified welds 222) of a new part 236 in view of welds 234 of a typical part model 228. In order to keep things simple, the typical part model 228 is a statistical model, and each weld 234 of both the new part 236 and typical part model 228 has only two feature characteristics 220: (e.g., average) current (i) and weld duration (T). Additionally, standard deviations are not shown for the typical part model 228.

In the example of FIG. 4a, both the new part 236 and the typical part model 228 have five welds 234. Thus, a simple analysis of the part 236 at block 310 might determine that the new part 236 has all required welds 234. However, a closer analysis of the new part 236 in view of the typical part model 228 might indicate that something is wrong. In particular, the third weld 234 of the new part 234 has feature characteristics 220 that are significantly different from the third weld 234 of the typical part model 228. Likewise for the fourth and fifth welds 234. Thus, in some examples, the missing weld identification program 300a might conclude that the new part 236 may have at least one extra weld 234 and/or at least one missing expected/required weld 234.

In the example of FIG. 3a, the missing weld identification program 300a proceeds to block 312 after block 310 if the missing weld identification program 300a determines that the part 236 has no missing welds 234. At block 312, the missing weld identification program 300a records the identified welds 222 as a part 236 of the identified parts 224 (if not already done). In some examples, the missing weld identification program 300a may additionally update feature characteristics 220 of the part 236 (e.g., to indicate number of missing/extra welds 234), and/or output a notification (e.g., via UI 216) to let the operator know that the part 236 has all required/expected welds 234. As shown, the missing weld identification program 300a then proceeds to block 314 after block 312, where the missing weld identification program 300a updates the typical part model(s) 228 (and/or missing part model(s) 232) with data from the new part 236. In some examples, block 314 may be skipped. While the missing weld identification program 300a is shown ending after block 314 in the example of FIG. 3a, in some examples, the missing weld identification program 300a may instead return to an earlier block (e.g., block 302 or block 304).

In the example of FIG. 3a, the missing weld identification program 300a proceeds to block 316 after block 310 if the missing weld identification program 300a determines that the part 236 has one or more missing welds 234. At block 316, the missing weld identification program 300a disables one or more pieces of welding equipment 151 (e.g., via one or more disable signals sent to the welding equipment 151). In some examples, this may prevent the operator 116 from continuing to assemble parts 236 without first fixing the part 236 with the missing weld(s) 234. In some examples, block 316 may be skipped, such as, for example, if the missing weld identification program 300a is being used to analyze parts 236 that were assembled some time in the past, rather than brand new parts 236 that just finished being assembled.

In the example of FIG. 3a, the missing weld identification program 300a proceeds to block 318 after block 316. At block 318, the missing weld identification program 300a determines the number of welds 234 missing from the part 236. In some examples, this may be a simple matter of comparing the number of expected welds 234 with the number of identified welds 222 of the part 236, as discussed above. In some examples, the missing weld identification program 300a may output a notification to the operator 116 (e.g., via UI 216) indicative of the number of missing welds 234. In some examples, block 318 may be skipped, such as, for example, where the determination at block 310 uses a typical part model 228 to determine whether there are missing welds 234.

In the example of FIG. 3a, the missing weld identification program 300a proceeds to block 320 after block 318. At block 320, the missing weld identification program 300a generates and/or accesses one or more missing weld part models 232. In some examples, different missing weld part models 232 may be representative of the part 236 with different welds 234 missing (e.g., weld 2, welds 1 and 3, welds 5, 8, and 16, etc.). By determining which missing weld part model(s) 232 is most similar to the part 236, the missing weld identification program 300a may be able to tell the operator 116 which particular welds 234 the part 236 is missing. Knowing which particular welds 234 are missing may be more helpful to an operator than simply knowing a certain number of welds 234 are missing.

In some examples, the missing weld identification program 300a may generate (and/or access) missing weld part models 232 representative of all possible missing weld 234 permutations of a part 236. In some examples, the missing weld identification program 300a may decline to generate missing weld part models 232 with more than a saved and/or set threshold number or percentage (e.g., 20, 25%, etc.) of missing welds 234 for reasons of practicality (e.g., problem may be too big to fix if above threshold anyway) and/or in order to save processing time. In some examples, several different missing weld part models 232 may be generated with the same missing welds 234, but from slightly different data sets (e.g., using only data corresponding one or more particular shifts, operators, pieces of equipment, etc.), similar to that which is described above with respect to generation of the typical part models 228. In some examples, the missing weld identification program 300a may choose which particular missing weld part models 232 to access and/or generate at block 320 based on set/saved parameters, user input, and/or one or more constraints 226. In some examples, a missing weld part model 232 may include, and/or be associated with, metadata indicative of its part type and/or particular missing weld(s) 234. In examples where the number of missing welds 234 is known, the missing weld identification program 300a may generate or access only missing weld part models 232 with the appropriate number of missing welds 234. In some examples, the missing weld part models 232 may be generated prior to block 320, and/or simply accessed from memory at block 320.

As noted above, real world data for parts 236 with one or more missing welds 234 may be difficult to obtain. Thus, in some examples, missing weld part models 232 may be generated from typical part models 228. For example, where the typical part model 228 is a statistical model, a corresponding missing weld part model 232 may be generated by duplicating the statistical model and removing one or more of the welds 234. In examples where a missing weld part model 232 is a data set collection, the data set collection may be generated by making a duplicate of a part 236 of the identified parts 224 (e.g., with no missing welds 234) and removing one or more of the welds 234 of the duplicate part 236. In some examples, where the missing weld part model 232 is a data set collection, the missing weld part model 232 may be the same as the typical part model 228; or the same except that the missing weld part model 232 has no parts 236 without missing welds 234. In examples where a missing weld part model 232 is a neural net, each neural net may be trained using a data set collection representative of parts 236 with one or more particular missing welds 234.

In the example of FIG. 3a, the missing weld identification program 300a proceeds to block 322 after block 320. At block 322, the missing weld identification program 300a analyzes the part 236 in view of the missing weld part model(s) 232 generated and/or accessed at block 320 and identifies one or more analogous missing weld part model(s) 232 (and/or analogous parts 236 having missing welds 234).

Where the missing weld part models 232 are neural nets, the analysis at block 322 may comprise inputting the identified welds 222 of the new part 236 into the neural net. The neural net, in turn, may analyze the feature characteristics 220 of the identified welds 222 and output a probability that the new part 236 has the same missing welds 234 as that particular missing weld part model 232. In some examples, the missing weld identification program 300a may identify any neural net outputting a probability over a particular (e.g., set and/or saved) threshold as an analogous missing weld part model 232. In some examples, the missing weld identification program 300a may identify the neural net that outputs the highest probability (e.g., over a particular threshold) as the analogous missing weld part model 232.

Where the missing weld part models 232 are statistical models, the analysis may comprise a statistical analysis (e.g., a Bayesian statistical analysis) of the feature characteristics 220 of the welds 234 of the part 236 in view of the feature characteristics 220 of the welds 234 of the statistical model. In some examples, only certain feature characteristics 220 may be compared (e.g., based on set/saved parameters, user input, and/or one or more constraints 226). In some examples, the result of the statistical analysis may be a probability that that the part 236 has the same missing weld(s) 234 as the statistical model. In some examples, the statistical analysis may determine a degree to which each weld 234 of the part 236 matches its corresponding weld 234 in the statistical model. In some examples, the probability that that the part 236 has the same missing weld(s) 234 may be determined based on degree to which each weld 234 of the part 236 matches its corresponding weld 234 in the statistical model. In some examples, the missing weld identification program 300a may identify any probability over a particular (e.g., set and/or saved) threshold as corresponding to an analogous missing weld part model 232. In some examples, the missing weld identification program 300a may identify the highest probability over a particular (e.g., set and/or saved) threshold as the analogous missing weld part model 232.

Where the missing weld part model 232 is one big data collection, the analysis may comprise one or more distance calculations and a KNN analysis to determine which K (e.g., 5, 10, 15, etc.) parts 236 of the data set collection are "nearest" to the new part 236. In some examples, the missing weld identification program 300a may require a part 236 to be within a certain (e.g., set and/or saved) threshold distance in order to be considered "nearest." In some examples, K may be a default value stored in memory. In some examples, the part tracking program 300 may determine K based user input and/or on one or more constraints 226. In some examples, the distance calculation(s) and/or KNN analysis may be performed using feature characteristics 220 of the different welds 234 in the part 236 and the data set collection. In some examples, only certain feature characteristics 220 may be analyzed (e.g., based on set/saved parameters, user input, and/or one or more constraints 226).

Since there may only be single missing weld part model 232 when using a data collection, the missing weld identification program 300a may identify analogous parts 236 of the data collection, rather than an analogous missing weld part model 232. In some examples, the missing weld identification program 300a may identify the majority of the K nearest parts 236 with the same missing welds 234 as being analogous. In some examples, the missing weld identification program 300a may identify a group of K nearest parts 236 with same missing welds 234 as analogous if that group is bigger in number/percentage than a (e.g., set and/or saved) threshold amount.

Figure 4B:
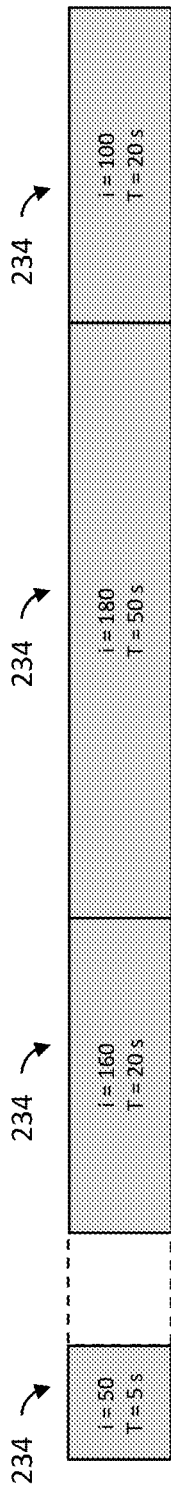
FIG. 4b is a diagram illustrating simple examples of missing weld part models, in accordance with aspects of this disclosure.
Figure 4B:
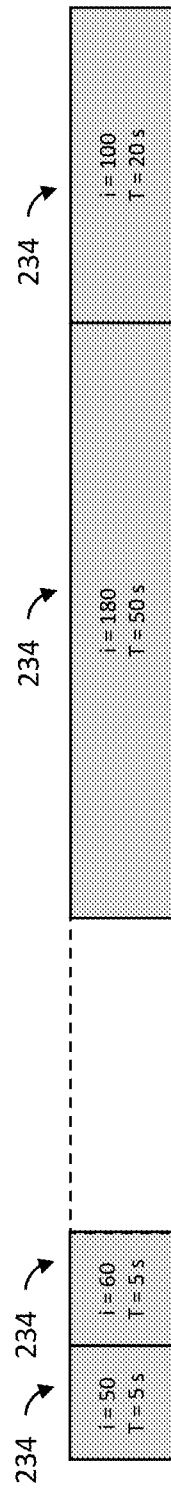
Figure 4B:
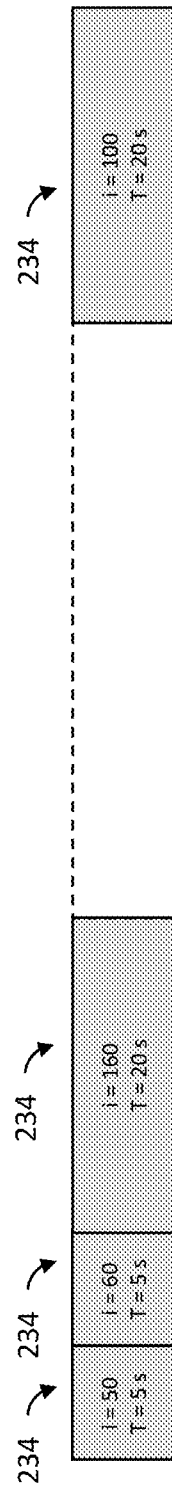

FIG. 4b is a diagram showing simple examples of (statistical) missing weld part models 232 corresponding to the same part type as the new part 236 and typical part model 228 of FIG. 4a. As shown, each missing weld part model 232 in FIG. 4b is missing a different weld 234, as if a different weld 234 was removed from the welds 234 of the typical part model 228 of FIG. 4a. Only one weld 234 is shown as missing in each missing weld part model 232 of FIG. 4a for the sake of simplicity.

In some examples, the missing weld identification program 300a may account for one or more extra welds 234 in its analysis of the new part 236 in view of the missing part models 232. For example, the missing weld identification program 300a may have learned that the new part 236 has an extra weld 234 from the analysis of block 310, and/or determine there is an extra weld 234 from its analysis at block 322. In some examples, the missing weld identification program 300a may select different welds 234 to skip/ignore to account for the extra weld 234.

In the example of FIG. 4a, the last weld 234 appears to be the extra weld 234, as it has feature characteristics similar to the first two expected/required welds 234 of the typical part model 228, but is at the end of the part 236, rather than the beginning. In some examples, the missing weld identification program 300a may specifically select to skip one or more welds 234 (such as the last weld 234) based on one or more feature characteristics 220. Thus, eventually the missing weld identification program 300a may analyze just the first four welds 234 of the new part 236. An analysis of just the first four welds 234 of the new part 236 in view of the welds 234 of the missing weld part models 232 of FIG. 4b (and their respective feature characteristics 220) might indicate that the new part 236 is most analogous to (and/or has the highest probability of missing the same weld(s) 234 as) the missing weld part model 232b.

In the example of FIG. 3a, the missing weld identification program 300a proceeds to block 324 after block 322. At block 324, the missing weld identification program 300a outputs a notification to the operator 116 (e.g., via UI 216) indicative of the particular missing welds 234 of the analogous missing weld part model(s) 232 (and/or analogous part(s) 236). In examples where more than one analogous missing weld part model 232 (and/or part 236) has been identified, the missing weld identification program 300a may also determine and/or output a probability that a particular set of missing welds 234 are the same missing welds 234 of the analyzed part 236.

In some examples, the missing weld identification program 300a may output a notification that the analysis was inconclusive, and/or that there is some anomaly, if no analogous missing weld part model(s) 232 (and/or analogous parts 236) were identified at block 322. In some examples, such a situation may arise if, for example, welds 234 were performed out of order rather than missed. In such a situation, the missing weld identification program 300a may (correctly) determine that the part 236 is neither similar to a typical part 236 having all expected/required welds 234 (e.g., in the right order), nor similar to a part 236 having particular missing welds 234, and therefore label the new part 236 an anomaly. While shown as ending after block 324 in the example of FIG. 3a, in some examples, the missing weld identification program 300a may return to a previous block (e.g., block 302, 304, or 306) after block 324, such as, for example, to allow the operator 116 an opportunity to correct the part 236 (e.g., by performing the missing welds 234). In such an example, the missing weld identification program 300a may re-enable any welding equipment 151 disabled at block 316.

In some examples, the part tracking system 200 may execute the missing weld identification program 300b instead of the missing weld identification program 300a. In some examples, the missing weld identification program 300a may be well suited to analyzing fully assembled parts 236 completed recently or in the past. In some examples, the missing weld identification program 300b may be well suited for analyzing parts 236 that are currently being assembled.

FIG. 3b shows a flowchart illustrating an example missing weld identification program 300b. In the example of FIG. 3b, the missing weld identification program 300b begins at block 352. At block 352, the missing weld identification program 300b collects sensor data 218, similar (and/or identical) to that which is described above with respect to block 302 of FIG. 3a. A duplicate description is omitted here for the sake of brevity.

In the example of FIG. 3b, the missing weld identification program 300b proceeds to block 354 after block 352. In the example of FIG. 3b, the missing weld identification program 300b identifies a start of a part assembly process, similar (and/or identical) to that which is described above with respect to block 304 of FIG. 3a. A duplicate description is omitted here for the sake of brevity.

In the example of FIG. 3b, the missing weld identification program 300b proceeds to block 356 after block 354. At block 356, the missing weld identification program 300b sets variable X to 1 (the use of variable X is discussed further below). As shown, the missing weld identification program 300b proceeds to block 358 after block 356. At block 358, the missing weld identification program 300b accesses and/or generates one or more typical part models 228 corresponding to the type of part 236 being assembled, similar (and/or identical) to that which is described above with respect to block 310 of FIG. 3a.

However, while the neural net typical part models 228 accessed/generated at block 310 may be trained using parts 224, the neural net typical part models 228 accessed/generated at block 358 may be trained using partial parts 236. For example, some neural nets may be trained using only the first weld 234a of parts 236 with no missing welds 234. Some neural nets may be trained using the first weld 234a and second weld 234b of parts 236 with no missing welds 234. Some neural nets may be trained using the first through third welds 234 of parts with no missing welds 234. And so on, and so on, until finally, some neural nets are trained using all the welds 234 of parts 236 with no missing welds 234 (similar to the neural nets of block 310 of FIG. 3a).

This training of neural net typical part models 228 using partial parts 236 may be necessary because only a partial part 236 may have been completed at block 358. The missing weld identification program 300b is used to analyze parts 236 during part assembly, as each new weld 234 is identified, and before all welds 234 of the part 236 have been identified and/or performed. This is in contrast to the missing weld identification program 300a which may analyze all the welds 234 of the part 236 after part assembly has completed. Though statistical models and/or data set collections are more flexible, and able to be scaled for comparisons to smaller sequential weld 234 sets without having to do special training, the neural net typical part models 228 may need special training with partial parts 236 to work in the missing weld identification program 300b.

In the example of FIG. 3b, the missing weld identification program 300b proceeds to block 360 after block 358. At block 360, the missing weld identification program 300b identifies the start and end of the next weld 234 in the part assembly process, determines feature characteristics 220 of the weld 234, and records the weld 234 as an identified weld 234, such as described above with respect to block 306 of FIG. 3a. A repeat of the above description is omitted here for the sake of brevity.

In the example of FIG. 3b, the missing weld identification program 300b proceeds to block 362 after block 360. At block 362, the missing weld identification program 300b analyzes the X welds 234 identified and/or completed so far in view of the typical part model(s) 228 generated and/or accessed at block 358. The analysis of block 362 may differ depending on the type of typical part model 228 used for the analysis.

Where a typical part model 228 is a data set collection, the analysis may comprise the same (or similar) sort of distance calculation(s) and KNN analysis described above with respect to blocks 310 and 322 of FIG. 3a. In some examples, the KNN analysis may determine distances between welds 234 of the in progress part 236, and corresponding welds 234 of each part 236 in the data set collection (e.g., based on the relative feature characteristics 220), and use these distances in the KNN analysis. However, as only X welds 234 of the in-progress part 236 have been completed/identified, in some examples, the KNN analysis at block 362 may only consider the first X welds 234 of each part 236 in the data set collection. Likewise, where a typical part model 228 is a statistical representation, the analysis of block 362 may comprise the same (or similar) sort of statistical analysis described above with respect to blocks 310 and 322 of FIG. 3a, but only considering the first X welds 234 of the statistical representation. Where the typical part model 228 is a neural net, the missing weld identification program 300b may use a neural net that has been trained on X number of welds 234, as described above.

In the example of FIG. 3b, the missing weld identification program 300b proceeds to block 364 after block 362. At block 364, the missing weld identification program 300b determines whether the X welds 234 of the new part 236 are the expected/required X welds 234, based on the analysis at block 362. In some examples, the missing weld identification program 300b may make the determination based on whether the analysis at block 362 produces a probability above a (e.g., set and/or saved) threshold.

For example, where the typical part model 228 is a neural net, the neural net may output a probability that the X identified welds 222 of the in progress part 236 are the expected/required X welds 234 of the appropriate part type (i.e., with no missing welds 234). Where the typical part model 228 is a statistical model, the result of the statistical analysis at block 362 may be a probability that the X identified welds 222 of the in progress part 236 are the expected/required X welds 234 of the appropriate part type (i.e., with no missing welds 234). Where the typical part model 228 is a data set collection, the result of the KNN analysis at block 362 may be a determination of which K (e.g., 5, 10, 15, etc.) parts 236 of the data set collection are "nearest" to the in progress part 236. However, a probability can be calculated in the KNN context as the number of the K nearest parts 236 with no missing welds 234 divided by K (and multiplied by 100). In some examples, the missing weld identification program 300b may determine that the X welds 234 of the new part 236 match the expected/required X welds 234 if the resulting probability from the analysis of block 364 is greater than a (e.g., set and/or saved) threshold.

In the context of the example new part 236 and typical part model 228 of FIG. 4a, the In the example of FIG. 3b, the missing weld identification program 300b proceeds to block 366 after block 364 if the missing weld identification program 300b determines that the X welds 234 of the new part 236 match the expected/required welds 234 for that particular type of part 236. At block 366, the missing weld identification program 300b determines whether an end of the part assembly process has been identified. In some examples, the missing weld identification program 300a may identify the end of the part assembly process based on user input and/or sensor data 218, similar (or identical) to that which is described above with respect to block 308 of FIG. 3a. If an end of the part assembly process is identified, the missing weld identification program 300b records the identified welds 222 as a part 236 of the identified parts 224 at block 370 (similar or identical to block 312 of FIG. 3a), then updates the typical part models 228 and/or missing weld part models 232 if appropriate at block 372 (similar to block 314 of FIG. 3a). Though, in the example of FIG. 3b, the missing weld identification program 300b is shown ending after block 372, in some examples, the missing weld identification program 300b may instead return to an earlier block (e.g., block 352 or block 354). If an end of the part assembly process is not identified at block 366, the missing weld identification program 300b increments the value of X at block 368, then returns to block 358.

In the context of FIG. 4a, the missing weld identification program 300b might initially (when X=1) analyze the first weld 234 of the new part 236 with respect to the first weld 234 of the typical part model 228. As the first weld 234 of the new part 236 has feature characteristics 220 similar to those of the first weld 234 of the typical part model 228, the missing weld identification program 300b might conclude there is a match at block 364. As the new part 236 has only just begun, the missing weld identification program 300b would fail to detect an end of the part 236 at block 366, then increment X at block 368.

On the second pass (X=2), the missing weld identification program 300b might again conclude there is a match due to the similar feature characteristics 220 of the first and second welds 234 of the new part 236 and the typical part model 228. However, on the third pass (X=3), the missing weld identification program 300b may find the third weld 234 of the new part 236 has feature characteristics 220 that are significantly different than those of the third weld 234 of the typical part model 228. Thus, the missing weld identification program 300b might determine on the third pass (with X=3) that the first three welds 234 of the new part 236 do not match the first three expected/required welds 234 represented by the typical part model 228.

In the example of FIG. 3b, the missing weld identification program 300b proceeds to block 374 after block 364 if the missing weld identification program 300b determines that the X welds 234 of the new part 236 do not match the expected/required welds 234 for that particular type of part 236. At block 374, the missing weld identification program 300b disables one or more pieces of welding equipment 151, so that the operator 116 is prevented from continuing welding (similar to block 316 of FIG. 3a). In some examples, block 374 may be skipped.

In the example of FIG. 3b, the missing weld identification program 300b proceeds to block 376 after block 374. At block 376, the missing weld identification program 300b generates and/or accesses one or more missing weld part models 232, similar (or identical) to block 320 of FIG. 3a. However, where a missing weld part model 232 is a neural net, the neural net may be trained using only X welds 234 (rather than all welds 234) of a part 236, similar to that which is described above with respect to block 358. Additionally, in some examples, the missing weld identification program 300b may only generate and/or access missing weld part models 232 where the first missing weld 234 occurs after X−1 welds 234 (e.g., to save processing time). In some examples, the missing weld identification program 300b may only generate and/or access missing weld part models 232 with consecutive missing welds 234 (e.g., to save processing time).

In the example of FIG. 3b, the missing weld identification program 300b proceeds to block 378 after block 376. At block 378, the missing weld identification program 300b analyzes the X welds 234 of the in progress part 236 in view of the one or more missing weld part models 232 generated and/or accessed at block 376, and identifies one or more missing weld part models 232 (and/or parts 236 with missing welds 234) as analogous missing weld part models 232 (and/or analogous parts 236). In some examples, block 378 of FIG. 3b may be similar (and/or identical) to block 322 of FIG. 3a, except that only X identified welds 222 of the in progress part 236 are analyzed, rather than all welds 234 of the new part 236.

In the context of FIG. 4b, the missing weld identification program 300b might suspect that at least the third weld 234 of the new part 236 is missing after the analysis at blocks 362 and 364 during the third pass (X=3) described above. Thus, in some examples, the missing weld identification program 300b might decline to access and/or generate the missing weld part model 232c entirely, as the missing weld part model 232c represents a part 236 with the fourth weld 234 being the first missing weld 234. Regardless, the missing weld identification program 300b may analyze the first three welds 234 of the new part 234 and the first three welds 234 of the missing weld part models 232 and determine (based on the relative feature characteristics 220) that the missing weld part model 232b is most analogous.

In the example of FIG. 3b, the missing weld identification program 300b proceeds to block 380 after block 378. At block 380, the missing weld identification program 300b outputs a notification (e.g., via UI 216) indicative of the particular missing welds 234 of the analogous missing weld part model(s) 232 (and/or analogous part(s) 236), similar (and/or identical) to block 324 of FIG. 3a. While shown as ending after block 380 in the example of FIG. 3b, in some examples, the missing weld identification program 300b may return to a previous block (e.g., block 358 or block 360) after block 380, such as, for example, to allow the operator 116 an opportunity to correct the part 236 by performing the missing welds 234. In such an example, the missing weld identification program 300b may re-enable any welding equipment 151 disabled at block 374.

The example part tracking systems 200 disclosed herein use machine learning techniques (e.g., deep learning/neural nets, statistical analysis, KNN) to identify whether an operator 116 has missed one or more welds 234 when assembling a part 236. The part tracking systems 200 can additionally identify which specific welds 234 were missed, so that an operator 116 knows exactly how to fix the part 236. The part tracking systems 200 may be able to identify missing welds 234 after a part has been completed, or in real-time, during assembly of the part 236. Identification of the particular weld(s) 234 missed during the part assembly process can help an operator 116 quickly assess and resolve any issues with the part 236 being assembled, saving time and ensuring quality.

The present methods and/or systems may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, a part, as used herein, may refer to a physical item that is prepared and/or produced through a welding-type process and/or operation, such as, for example, by welding two or more workpieces together. In some contexts, a part may refer to data stored in non-transitory memory that is representative of a physical item prepared and/or produced through a welding-type process and/or operation.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A system, comprising:
    processing circuitry; and
    memory circuitry comprising computer readable instructions which, when executed, cause the processing circuitry to:
        identify an initial weld of a part assembly process,
        access one or more first feature characteristics of the initial weld,
        access a typical part model representative of a part produced by the part assembly process with all required welds,
        determine whether the part includes an initial required weld based on a comparison of at least some of the first feature characteristics of the initial weld with at least some first typical feature characteristics associated with an initial typical weld of the typical part model, and
        in response to determining that the part does not include the initial required weld, disable one or more pieces of welding equipment involved in the part assembly process.

2. The system of claim 1, wherein one or more machine learning techniques are used to determine whether the part includes the initial required weld.

3. The system of claim 1, wherein the memory circuitry further comprises computer readable instructions which, when executed, cause the processing circuitry to: in response to determining that the part does not include the initial required weld, output a notification.

4. The system of claim 1, wherein accessing the typical part model comprises generating the typical part model using a collection of typical feature characteristics associated with welds that were used previously to create the part.

5. The system of claim 1, wherein the typical part model comprises a neural net, a statistical model, or a data set collection.

6. The system of claim 1, wherein the initial weld occurs first in time after a start of the part assembly process, and before any other weld in the part assembly process.

7. The system of claim 6, wherein the memory circuitry further comprises computer readable instructions which, when executed, cause the processing circuitry to identify the start of the part assembly process based on data received from one or more sensors, a user interface, welding equipment, or a welding robot.

8. The system of claim 1, wherein the memory circuitry further comprises computer readable instructions which, when executed, cause the processing circuitry to:
    in response to determining that the part does include the initial required weld:
        identify a subsequent weld of the welding assembly process, wherein one or more second feature characteristics are associated with the subsequent weld, and
        determine whether the part includes a subsequent required weld based on a comparison of at least some of the second feature characteristics with at least some second typical feature characteristics associated with a subsequent typical weld of the typical part model.

9. The system of claim 1, wherein the memory circuitry further comprises computer readable instructions which, when executed, cause the processing circuitry to:
    in response to determining that the part does not include the initial required weld:
        access one or more missing weld part models, each of the one or more missing weld part models being representative of the part with one or more missing welds,
        determine an analogous missing weld part model of the one or more missing weld part models that is most similar to the part using one or more machine learning techniques, and
        output a notification, wherein the notification is representative of the one or more missing welds of the analogous missing weld part model.

10. The system of claim 9, wherein each initial model weld of each missing weld part model of the one or more missing weld part models is associated with one or more first model feature characteristics, and the analogous missing weld part model is determined via a comparison of at least some of the one or more first feature characteristics associated with the initial weld with at least some of one or more first model feature characteristics associated with each initial model weld.

11. A method, comprising:
    identifying, via processing circuitry, an initial weld of a part assembly process;
    accessing one or more first feature characteristics of the initial weld;
    accessing a typical part model representative of a part produced by the part assembly process with all required welds;

determining, via the processing circuitry, whether the part includes an initial required weld based on a comparison of at least some of the first feature characteristics of the initial weld with at least some first typical feature characteristics associated with an initial typical weld of the typical part model; and in response to determining that the part does not include the initial required weld, disabling one or more pieces of welding equipment involved in the part assembly process.

12. The method of claim 11, wherein one or more machine learning techniques are used to determine whether the part includes the initial required weld.

13. The method of claim 11, further comprising outputting a notification in response to determining that the part does not include the initial required weld.

14. The method of claim 11, wherein accessing the typical part model comprises generating the typical part model using a collection of typical feature characteristics associated with welds that were used previously to create the part.

15. The method of claim 11, wherein the typical part model comprises a neural net, a statistical model, or a data set collection.

16. The method of claim 11, wherein the initial weld occurs first in time after a start of the part assembly process, and before any other weld in the part assembly process.

17. The method of claim 16, further comprising identifying the start of the part assembly process, based on data received from one or more sensors, welding equipment, a welding robot, or a user interface.

18. The method of claim 11, further comprising:
in response to determining that the part does include the initial required weld:
identifying a subsequent weld of the welding assembly process, wherein one or more second feature characteristics are associated with the subsequent weld; and
determining whether the part includes a subsequent required weld based on a comparison of at least some of the second feature characteristics with at least some second typical feature characteristics associated with a subsequent typical weld of the typical part model.

19. The method of claim 11, further comprising:
in response to determining that the part does not include the initial required weld:
accessing one or more missing weld part models, each of the one or more missing weld part models being a modified version of the typical part model representative of the part with one or more missing welds; and
determining an analogous missing weld part model of the one or more missing weld part models that is most similar to the part using one or more machine learning techniques, and
outputting a notification, wherein the notification is representative of the one or more missing welds of the analogous missing weld part model.

20. The method of claim 19, wherein each initial model weld of each missing weld part model of the one or more missing weld part models is associated with one or more first model feature characteristics, and the analogous missing weld part model is determined via a comparison of at least some of the one or more first feature characteristics associated with the initial weld with at least some of one or more first model feature characteristics associated with each initial model weld.

* * * * *